US009166707B2

(12) United States Patent
Matsuura

(10) Patent No.: US 9,166,707 B2
(45) Date of Patent: Oct. 20, 2015

(54) TRANSMITTER, SIGNAL GENERATION DEVICE, CALIBRATION METHOD, AND SIGNAL GENERATION METHOD

(71) Applicant: Panasonic Corporation, Osaka (JP)

(72) Inventor: Toru Matsuura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 57 days.

(21) Appl. No.: 14/131,652

(22) PCT Filed: Mar. 28, 2013

(86) PCT No.: PCT/JP2013/002145
§ 371 (c)(1),
(2) Date: Jan. 8, 2014

(87) PCT Pub. No.: WO2013/145762
PCT Pub. Date: Oct. 3, 2013

(65) Prior Publication Data
US 2014/0155006 A1 Jun. 5, 2014

(30) Foreign Application Priority Data

Mar. 28, 2012 (JP) ................ 2012-074719
Mar. 29, 2012 (JP) ................ 2012-078308

(51) Int. Cl.
*H04B 1/04* (2006.01)
*H03C 1/62* (2006.01)
(Continued)

(52) U.S. Cl.
CPC .......... *H04B 17/0015* (2013.01); *H04B 7/005* (2013.01); *H04B 17/11* (2015.01);
(Continued)

(58) Field of Classification Search
CPC ............ H04L 27/364; H04B 17/0015; H04B 17/0017; H04B 17/002; H04B 17/0027; H04B 17/0085

USPC .......... 455/67.11, 67.13, 67.14, 114.3, 115.1, 455/115.2
See application file for complete search history.

(56) References Cited

U.S. PATENT DOCUMENTS 6,819,910 B2 * 11/2004 Shi et al. .................. 455/126
7,881,402 B2    2/2011 Gao et al.
(Continued)

FOREIGN PATENT DOCUMENTS

JP     08213846 A    8/1996
JP   2001016145 A    1/2001
(Continued)

OTHER PUBLICATIONS

International Search Report and Written Opinion mailed Jun. 4, 2013, for corresponding International Application No. PCT/JP2013/002145, 8 pages.

*Primary Examiner* — Duc M Nguyen
(74) *Attorney, Agent, or Firm* — Seed IP Law Group PLLC

(57) ABSTRACT

It is intended to provide a transmitter capable of correcting signal distortion with high accuracy. Provided are a test signal generator; a frequency characteristics corrector for correcting an amplitude characteristic and a phase characteristic of a test signal; a modulator; an envelope detector; a frequency characteristics calculator for calculating frequency characteristics of an envelope signal; and a coefficients calculator for calculating, on the basis of the frequency characteristics, correction coefficients to be used for correcting the amplitude characteristic and the phase characteristic of the test signal. The test signal generator generates a test signal in which signal loci in each of at least two pairs of quadrants of first to fourth quadrants of the IQ plane are not symmetrical with each other.

22 Claims, 23 Drawing Sheets

(51) Int. Cl.
    *H04B 17/00*     (2015.01)
    *H04B 7/005*     (2006.01)
    *H04L 27/00*     (2006.01)
    *H04L 27/18*     (2006.01)
    *H04B 17/11*     (2015.01)
    *H04B 17/14*     (2015.01)
    *H04L 27/36*     (2006.01)

(52) U.S. Cl.
    CPC ............... *H04B 17/14* (2015.01); *H04L 27/00* (2013.01); *H04L 27/18* (2013.01); *H04L 27/36* (2013.01); *H04L 27/364* (2013.01)

(56) References Cited

U.S. PATENT DOCUMENTS

| | | | |
|---|---|---|---|
| 7,944,984 B1* | 5/2011 | Wu et al. | 375/261 |
| 2005/0075815 A1* | 4/2005 | Webster et al. | 702/106 |
| 2005/0118963 A1* | 6/2005 | Chiu | 455/115.1 |
| 2006/0062324 A1 | 3/2006 | Naito et al. | |
| 2007/0092023 A1* | 4/2007 | Kang et al. | 375/281 |
| 2008/0025381 A1 | 1/2008 | Lee et al. | |
| 2010/0195706 A1 | 8/2010 | Yanagisawa et al. | |
| 2010/0198540 A1 | 8/2010 | Yanagisawa et al. | |
| 2010/0239056 A1 | 9/2010 | Matsuno et al. | |
| 2012/0213266 A1* | 8/2012 | Su et al. | 375/226 |
| 2013/0287082 A1* | 10/2013 | Chen et al. | 375/226 |

FOREIGN PATENT DOCUMENTS

| | | |
|---|---|---|
| JP | 2002252663 A | 9/2002 |
| JP | 2006115463 A | 4/2006 |
| JP | 2009540672 A | 11/2009 |
| WO | 2007122880 A1 | 11/2007 |
| WO | 2008018263 A1 | 2/2008 |
| WO | 2009008445 A1 | 1/2009 |

* cited by examiner

FIG. 21

| VALUE OF $\theta$ | $-45° \leq \theta < 45°$ | $45° \leq \theta < 135°$ | $-135° \leq \theta < 180°$ $-180° \leq \theta < 135°$ | $-135° \leq \theta < -45°$ |
|---|---|---|---|---|
| DIRECTION OF IQ IMBALANCE | ge: NEGATIVE | $\theta$ e: NEGATIVE | ge: POSITIVE | $\theta$ e: POSITIVE |

TRANSMITTER, SIGNAL GENERATION DEVICE, CALIBRATION METHOD, AND SIGNAL GENERATION METHOD

TECHNICAL FIELD

This disclosure relates to a transmitter, a signal generation device, a calibration method, and a signal generation method. For example, the disclosure relates to calibration of frequency characteristics in a transmitter and an IQ signal calibration technique in a transmitter.

BACKGROUND ART

In wireless communication, distortion occurs depending on the frequency of the signal when a baseband signal as a transmission signal is up-converted into a high-frequency signal and a high-frequency signal as a reception signal is down-converted into a baseband signal. For example, a frequency characteristics correcting device disclosed in Patent document 1 is known as a device for correcting signal distortion.

In the frequency characteristics correcting device of Patent document 1, in signal transmission by a transmission system circuit, part of a transmission signal is extracted by a coupling circuit and divided into a low-frequency portion and a high-frequency portion by respective band division filters and outputs (power levels) of the respective filters are detected by respective power detectors. Furthermore, in the frequency characteristics correcting device, a variable equalizer circuit is controlled on the basis of a voltage that is obtained by comparing outputs of the respective power detectors by a comparison circuit.

PRIOR ART DOCUMENTS

Patent Documents

Patent document 1: JP-A-2001-16145

SUMMARY OF THE INVENTION

Problems to be Solved by the Invention

In the frequency characteristics correcting device of Patent document 1, it is difficult to correct signal distortion with high accuracy.

This disclosure has been made in the above circumstances, and an object of the present invention is to provide a transmitter, a signal generation device, a calibration method, and a signal generation method which can correct signal distortion with high accuracy.

Means for Solving the Problems

This disclosure provides a transmitter comprising a test signal generator for generating a test signal; a frequency characteristics corrector for correcting an amplitude characteristic and a phase characteristic of the test signal generated by the test signal generator; a modulator for modulating a corrected signal produced by the frequency characteristics corrector through the correction; an envelope detector for detecting an envelope of a modulated signal produced by the modulator through the modulation; a frequency characteristics calculator for calculating frequency characteristics of an envelope signal detected by the envelope detector; and a coefficients calculator for calculating, on the basis of the frequency characteristics calculated by the frequency characteristics calculator, correction coefficients to be used by the frequency characteristics corrector to correct the amplitude characteristic and the phase characteristic of the test signal, wherein the test signal generator generates a test signal in which signal loci in each of at least two pairs of quadrants of first to fourth quadrants of the IQ plane are not symmetrical with each other.

Advantageous Effects of the Invention

The disclosure makes it possible to correct signal distortion with high accuracy.

BRIEF DESCRIPTION OF THE DRAWINGS

FIG. 21 is a table showing an example relationship between the detected phase and the IQ imbalance direction in the second embodiment of the disclosure.

MODE FOR CARRYING OUT THE INVENTION

Embodiments of this disclosure will be hereinafter described with reference to the drawings.

Circumstances Leading to One Mode of Disclosure

For example, signal distortion that depends on the frequency used tends to appear in an analog circuit including a frequency converter which performs frequency conversion of a baseband signal and a high-frequency signal, a power amplifier, and an LNA unit. In particular, in millimeter wave communication that handles frequencies in a wide band (e.g., 60 GHz band), the communication characteristics may be degraded to a large extent because of a wide signal band.

When the frequency characteristics correcting device of Patent document 1 is applied to millimeter wave communication, frequency characteristics of signal distortion are corrected linearly on the basis of signal detection results at several component frequencies. However, with the linear correction, the communication characteristic may be degraded because it is insufficient for correction of large signal distortion as occurs in the process of frequency conversion of a baseband signal or a high-frequency signal or amplification of a wideband high-frequency signal. It is therefore necessary to correct signal distortion with even higher accuracy.

Transmitters, signal generation devices, and calibration methods which can correct signal distortion with high accuracy will be described below.

Embodiment 1

Figure 1:
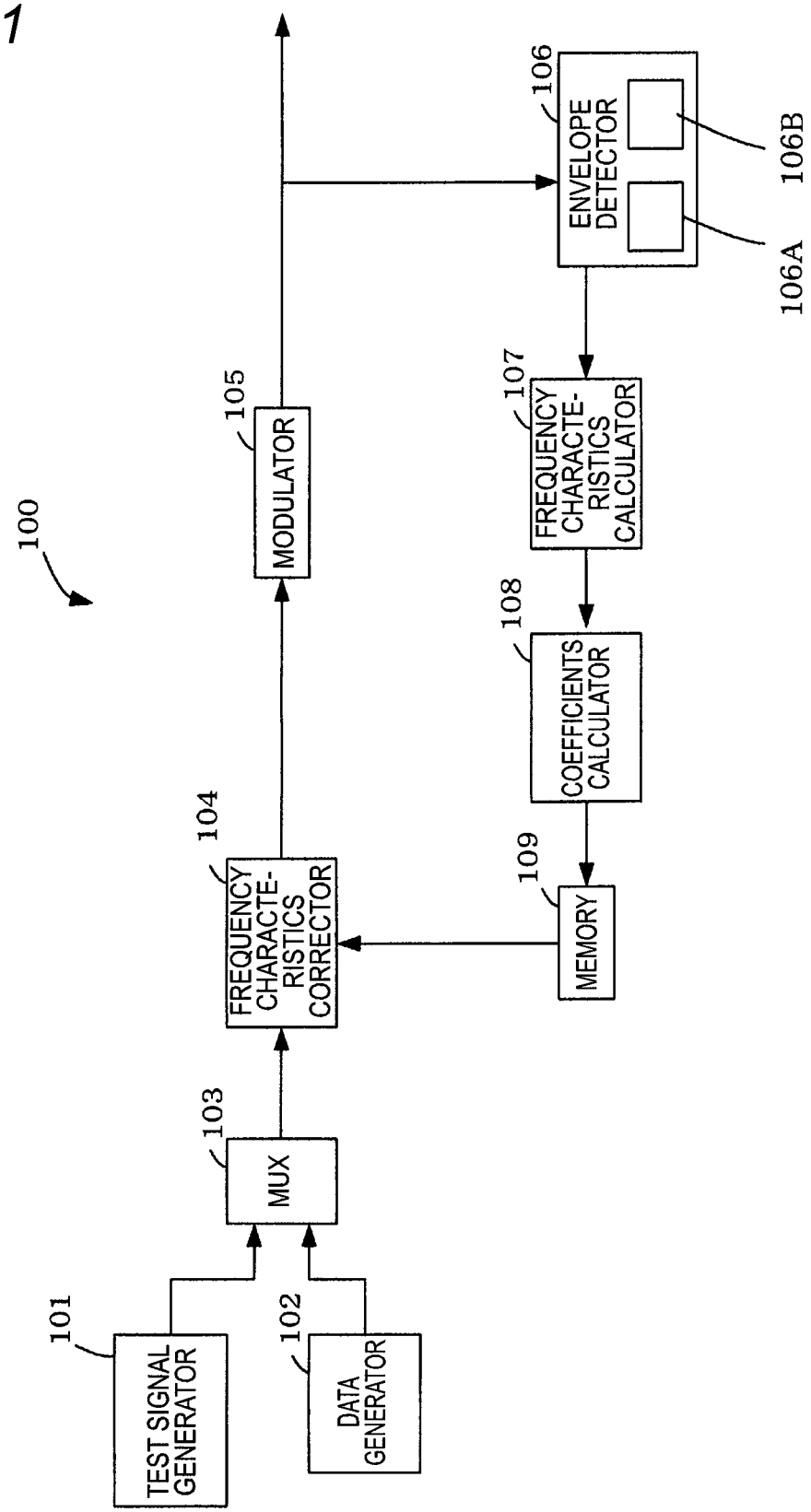
FIG. 1 is a block diagram showing an example configuration of a transmitter according to a first embodiment of this disclosure.

FIG. 1 is a block diagram showing an example configuration of a transmitter 100 according to a first embodiment of the disclosure. The transmitter 100 is equipped with a test signal generator 101, a data generator 102, an MUX (multiplexer) 103, a frequency characteristics corrector 104, a modulator 105, an envelope detector 106, a frequency characteristics calculator 107, a coefficients calculator 108, and a memory 109.

The test signal generator 101 generates a test signal for measurement of distortion produced by the transmitter 100, and outputs it to the MUX 103. A test signal generation method will be described later in detail.

The data generator 102 generates a baseband signal containing data to be transmitted and outputs it to the MUX 103. For example, the data to be transmitted contains musical data or video data.

The MUX 103 selects the output of the test signal generator 101 or that of the data generator 102, and outputs the selected signal to the frequency characteristics corrector 104. More specifically, the MUX 103 selects the output (test signal) of the test signal generator 101 in a calibration mode, and selects the output (baseband signal) of the data generator 102 in a data transmission mode. The MUX 103 also selects a mode in which to specify an operation of the transmitter 100.

The frequency characteristics corrector 104 corrects the frequency characteristics of the output signal of the MUX 103 on the basis of parameters (correction coefficients) stored in an LUT (lookup table) which is held by the memory 109, and outputs a resulting corrected signal to the modulator 105. The frequency characteristics include an amplitude characteristic and a phase characteristic.

The modulator 105 modulates the corrected signal that is output from the frequency characteristics corrector 104, and outputs a resulting modulated signal (high-frequency signal). For example, the output V(t) of the modulator 105 is given by the following Equation (1):

[Formula 1]

$$V(t)=A(t)\cos(\omega t+\theta(t)) \quad \text{(Formula 1)}$$

The frequency of the output V(t) depends on ω in Equation (1) and is determined by $f=\omega/2\pi$. The frequency is 60 GHz, for example.

The envelope detector 106 is equipped with an envelope detector 106A and an AD converter 106B which is disposed downstream of the envelope detector 106A so as to be connected to it in series.

The envelope detector 106A, which is formed by using a wave detection diode, detects an envelope of the high-frequency signal that is output from the modulator 105. The envelope detector 106A receives part of the output energy of the high-frequency signal and detects the magnitude of an envelope of the high-frequency signal.

A detected signal of the envelope detector 106A is given by the following Formula (2):

[Formula 2]

$$c|A(t)| \text{ OR } c|A(t)|^2 \quad \text{(Formula 2)}$$

Symbol c represents a constant.

The AD converter 106B converts the analog signal as the envelope detection result into a digital signal, and outputs the digital signal (envelope signal) to the frequency characteristics calculator 107.

The frequency characteristics calculator 107 receives the signal (envelope signal) detected by the envelope detector 106, and calculates frequency characteristics of the envelope signal.

The coefficients calculator 108 calculates correction coefficients for correction of the frequency characteristics (amplitude characteristic and phase characteristic) of the test signal on the basis of the frequency characteristics calculated by the frequency characteristics calculator 107. The coefficients calculator 108 stores the calculated correction coefficients in the LUT which is held by the memory 109.

The frequency characteristics calculator 107 and the coefficients calculator 108 realize their functions by running programs that are stored in the memory 109. How the frequency characteristics calculator 107 and the coefficients calculator 108 operate will be described later in detail.

The transmitter 100 may be implemented by using a first integrated circuit and a second integrated circuit. The first integrated circuit includes the test signal generator 101, the data generator 102, the MUX 103, the frequency characteristics corrector 104, the frequency characteristics calculator 107, the coefficients calculator 108, and the memory 109. The second integrated circuit includes the modulator 105 and the envelope detector 106. Alternatively, all the constituent units of the transmitter 100 may be implemented as a single integrated circuit.

When the transmitter 100 is in the calibration mode, a detection system including the envelope detector 106, frequency characteristics calculator 107, and the coefficients calculator 108 operates.

Next, the test signal generator 101 will be described.

For example, the test signal generator 101 generates a test signal S that is represents by the following Equations (3):

[Formulae 3]

$$\begin{cases} I = K\cos(\omega_{m,n}t) + d \\ Q = K\sin(\omega_{m,n}t) \end{cases} \quad \text{(Formula 3)}$$

In Equations (3), $\omega_{m,\ n}$ is the angular frequency, d is a constant indicating an offset amount, and K is a constant representing the amplitude.

The frequency of the test signal S which is generated by the test signal generator 101 depends on $\omega_{m,\ n}t$ in Equation (3) and is determined by $f=\omega_{m,\ n}t/2\pi$. For example, the frequency of the test signal S is 100 MHz or 500 MHz. That is, the angular frequency $\omega_{m,\ n}$ in Equation (3) is sufficiently lower than the angular frequency $\omega$ in Equation (1).

Figure 2:
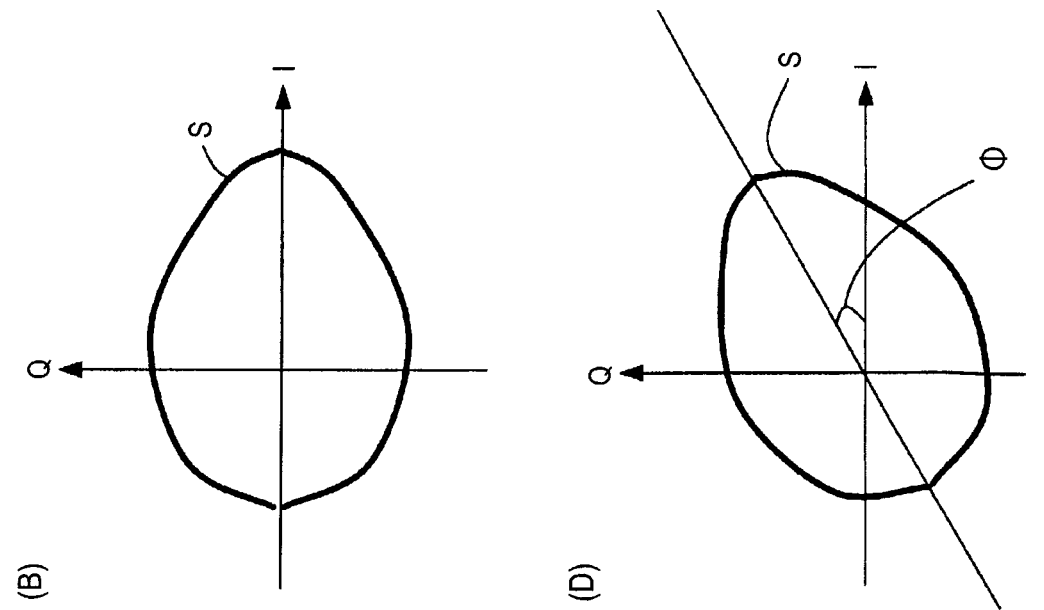
FIGS. 2(A), 2(B), and 2(D) show example test signals generated by a test signal generator used in the first embodiment of the disclosure.
FIG. 2(C) shows a phase characteristic of a test signal.
Figure 2:
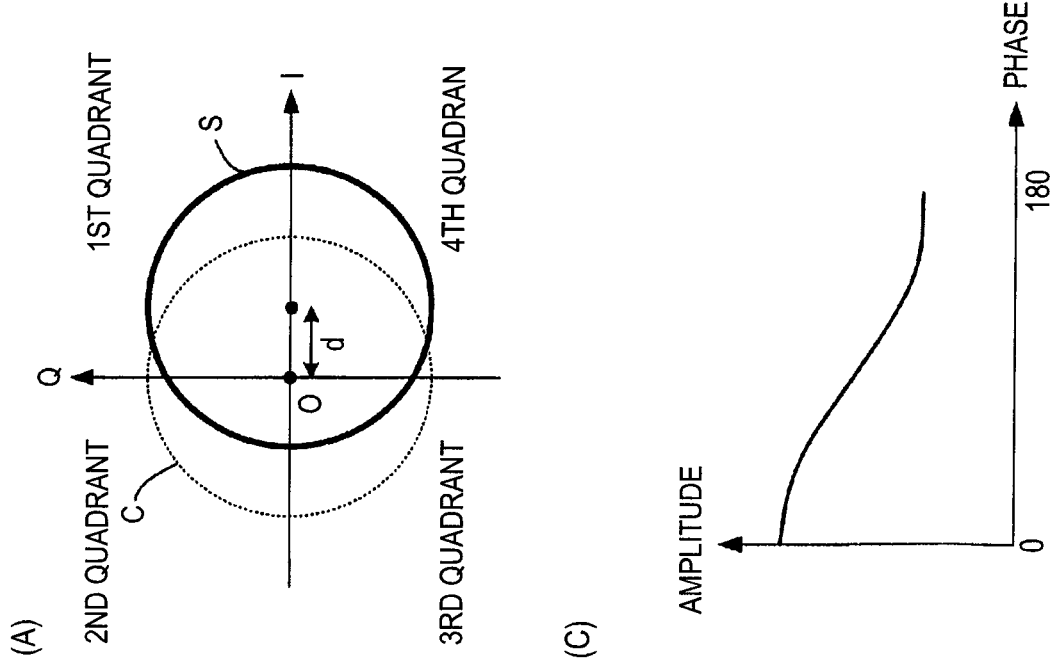

FIG. 2(A) is a diagram in which the test signal S of Equation (3) is shown in the IQ plane. The test signal S is represented by a circle that is offset by the distance d from a circle C whose center is located at the origin O of the IQ plane and that is the same in amplitude as the test signal S. The test signal S may rotate at a constant speed along the circle but need not always do so.

The test signal generator 101 may generate, as a test signal, an IQ signal that is not given by Equations (3). The test signal generator 101 may generate an IQ signal that is symmetrical with respect to the I axis (see FIG. 2(B)) or the Q axis.

The test signal generator 101 may generate an IQ signal that is obtained by rotating an IQ signal that is symmetrical with respect to the I axis or the Q axis about the origin O of the IQ plane. Also in these cases, the center of the test signal S is offset by a prescribed amount from the origin O. The test signal S may rotate at a constant speed along the line but need not always do so. The I axis and the Q axis are examples of a reference axis.

Where the test signal shown in FIG. 2(A) or 2(B) is generated by the test signal generator 101, it has such a characteristic that as shown in FIG. 2(C) its amplitude varies monotonously as its phase varies from φ to φ+180°, φ being a phase of its line of symmetry (the reference axis passing through the origin). The case of FIG. 2(D) is different from that of FIG. 2(B) in that the line of symmetry has a phase φ.

That is, it suffices that the loci of the test signal in each of at least two pairs of quadrants of the first to fourth quadrants of the IQ plane be not symmetrical with each other.

For example, in the case of FIG. 2(A), the loci in the first and second quadrants is not symmetrical with each other, the loci in the first and third quadrants is not symmetrical with each other, the loci in the second and fourth quadrants is not symmetrical with each other, the loci in the first and fourth quadrants is symmetrical with each other, and the loci in the second and third quadrants is symmetrical with each other.

In the case of FIG. 2(B), the loci in the first and second quadrants is not symmetrical with each other, the loci in the first and third quadrants is not symmetrical with each other, the loci in the second and fourth quadrants is not symmetrical with each other, the loci in the first and fourth quadrants is symmetrical with each other, and the loci in the second and third quadrants is symmetrical with each other.

In the case of FIG. 2(D), the loci in every pair of quadrants are not symmetrical with each other.

Where the test signal C shown in FIG. 2(A) with which the circle having the center at the origin is drawn in the IQ plane is used, the magnitude of an envelope detected by the envelope detector 106 is constant. Therefore, this test signal C does not have an AC signal component and hence it is difficult to obtain its phase characteristic.

The magnitude of an envelope can be varied when the test signal generator 101 generates a test signal S that is offset from the origin by a prescribed amount. Therefore, an amplitude characteristic and a phase characteristic can be acquired by using such a test signal S.

Figure 3:
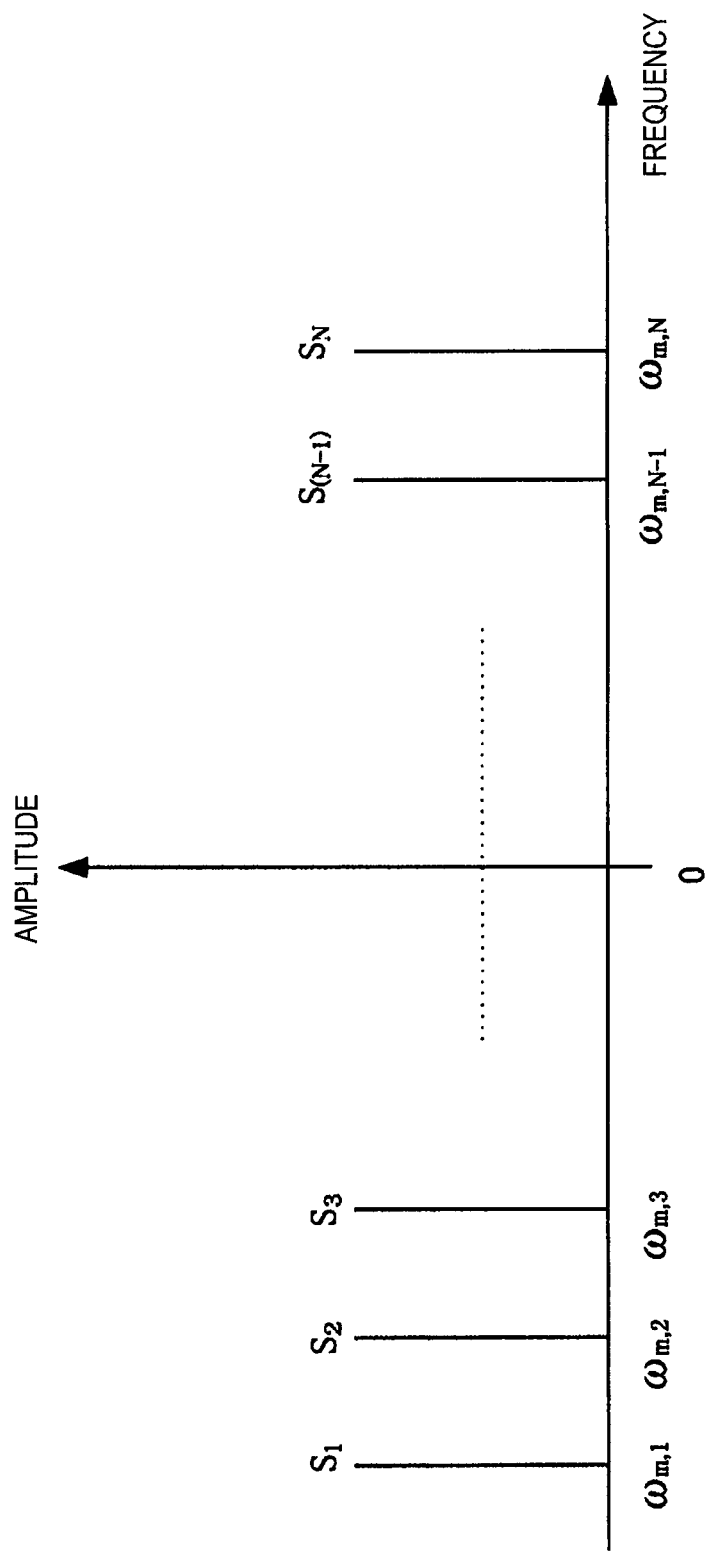
FIG. 3 shows an example relationship between components, having respective angular frequencies, of a test signal and their amplitudes in the first embodiment of the disclosure.

As shown in FIG. 3, the test signal generator 101 sweeps the angular frequency $\omega_{m,\ n}$ of the test signal S in order from n=1 to N. FIG. 3 shows an example relationship between components, having the angular frequencies $\omega_{m,\ n}$, of the test signal S and their amplitudes. In FIG. 3, the sweep range of the frequency ($=\omega_m/2\pi$) of the test signal S is −1 GHz to 1 GHz, for example, and the interval between adjoining component frequencies is 100 MHz, for example.

For example, a test signal having an angular frequency $\omega_{m,\ 1}$ is used as a first test signal $S_1$ and a test signal having an angular frequency $\omega_{m,\ n}$ is used as an nth test signal $S_n$. Finally, a test signal having an angular frequency $\omega_{m,\ N}$ is used as an Nth test signal $S_N$. The test signal $S_n$ is a component, having the angular frequency $\omega_{m,\ n}$, of the test signal S.

The value N is the number of samples for determining frequency characteristics of the test signal $S_n$. It is preferable that the test signal generator 101 set the value N taking into consideration at what frequency interval frequency characteristics are to be analyzed and at what resolution frequency characteristics are to be corrected. The value N may be set in advance.

Next, the frequency characteristics corrector 104 will be described.

Figure 4:
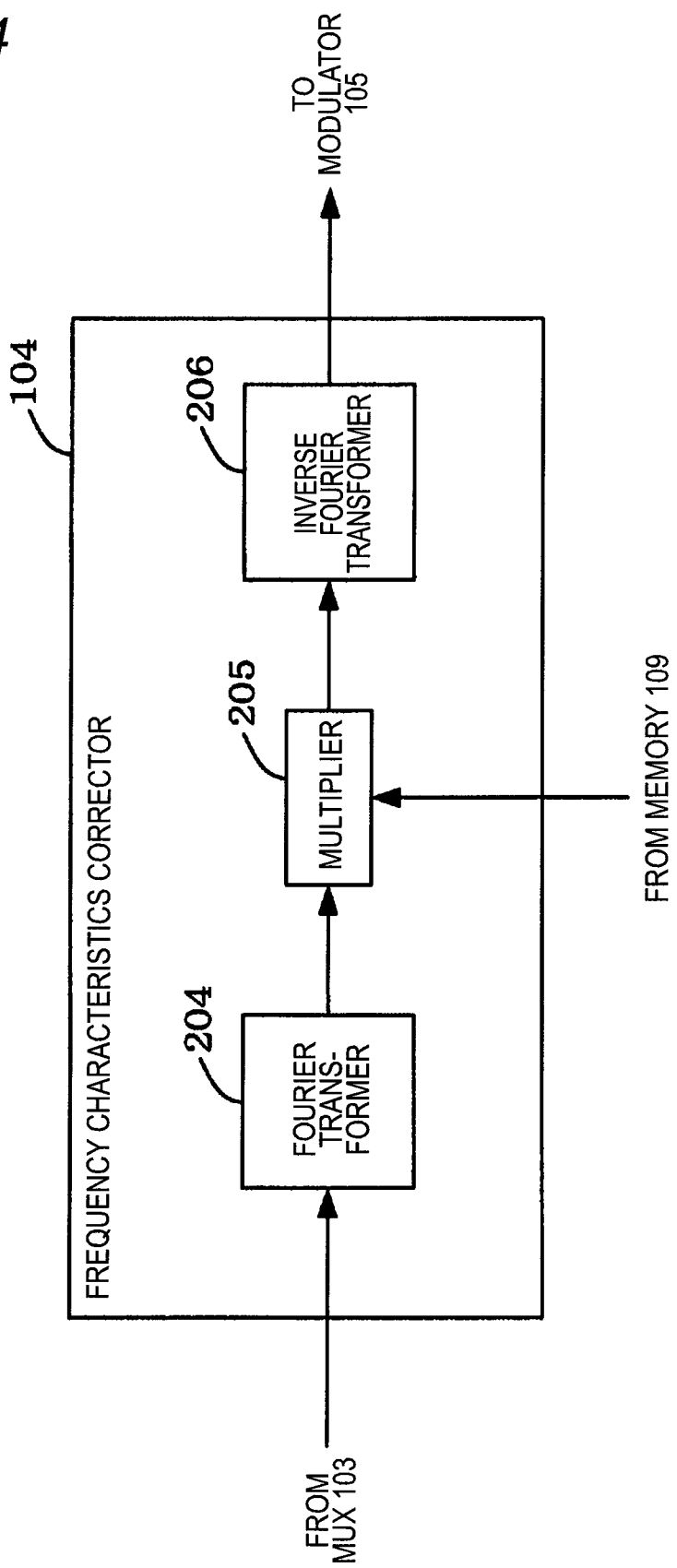
FIG. 4 is a block diagram showing an example detailed configuration of a frequency characteristics corrector used in the first embodiment of the disclosure.

FIG. 4 is a block diagram showing an example detailed configuration of the frequency characteristics corrector 104.

The frequency characteristics corrector 104 is equipped with a Fourier transformer 204, a multiplier 205, and an inverse Fourier transformer 206.

The Fourier transformer 204 converts a time-domain signal which is an output signal of the MUX 103 into a frequency-domain signal. Since the output signal of the MUX 103 is an IQ signal, the Fourier transformer 204 converts it as complex data. The Fourier transformer 204 performs fast Fourier transform (FFT), for example.

The multiplier 205 multiples the frequency-domain signal that is output from the Fourier transformer 204 by correction coefficients that are stored in the LUT held by the memory 109.

The inverse Fourier transformer 206 converts the frequency-domain signal that is output from the multiplier 205 into a time-domain signal. The inverse Fourier transformer 206 performs inverse fast Fourier transform (IFFT), for example.

Next, a description will be made of an example operation for calculating correction coefficients for correction of frequency characteristics on the basis of a test signal in the transmitter 100.

Figure 5:
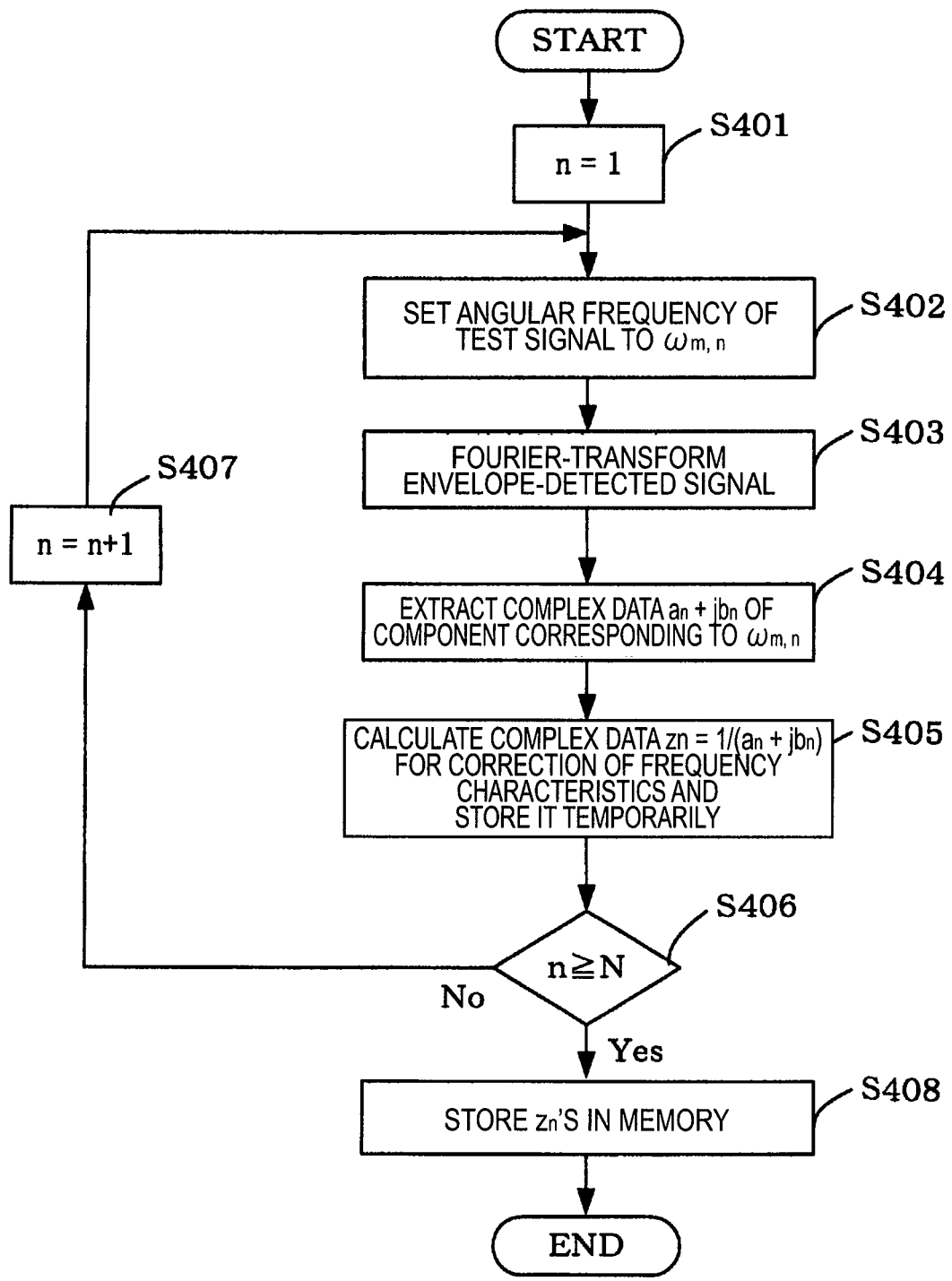
FIG. 5 is a flowchart of a first example operation for calculating correction coefficients in the transmitter according to the first embodiment of the disclosure.

FIG. 5 is a flowchart of a first example operation for calculating correction coefficients for correction of frequency characteristics on the basis of a test signal S in the transmitter 100. The example of FIG. 5 assumes that coefficients $z_n$ of the respective angular frequencies $\omega_{m,n}$ are calculated by one frequency sweep. In the example of FIG. 5, the coefficients $z_n$ are correction coefficients.

First, the test signal generator 101 sets variable n to an initial value "1" (step S401).

The test signal generator 101 then generates a test signal S and sets its angular frequency to the angular frequency $\omega_{m,n}$ (step S402).

During a period when the test signal generator 101 is performing a frequency sweep, the frequency characteristics corrector 104 does not perform frequency characteristics correction or performs frequency characteristics correction by setting the coefficients $z_n$ stored in the LUT to "1."

Then the frequency characteristics calculator 107 receives an envelope signal corresponding to a test signal $S_n$ having the angular frequency ($\omega_{m,n}$ and Fourier-transforms it (step S403). That is, the frequency characteristics calculator 107 has a Fourier transformer. To increase the calculation efficiency, the frequency characteristics calculator 107 uses fast Fourier transform (FFT), for example.

The frequency characteristics calculator 107 then extracts component complex data $a_n + jb_n$ of the angular frequency $\omega_{m,n}$ in the IQ plane (step S404).

The frequency characteristics calculator 107 may calculate an amplitude $m_n$ and a phase $\theta_n$ according to respective Equations (4) and (5) on the basis of the extracted data $a_n + jb_n$:

[Formula 4]

$$m_n = \sqrt{a_n^2 + b_n^2} \quad \text{(Formula 4)}$$

[Formula 5]

$$\theta_n = \arg(a_n + jb_n) \quad \text{(Formula 5)}$$

That is, frequency characteristics, including an amplitude characteristic and a phase characteristic, of the component of the angular frequency $\omega_{m,n}$ are obtained by executing step S404. The frequency characteristics are of the transmitter 100 itself and, more specifically, are frequency characteristics of distortion that originates from, for example, the analog circuit of the transmitter 100.

Subsequently, the coefficients calculator 108 calculates a coefficient $z_n$ which is complex data for correction of the frequency characteristics of the transmitter 100, and has the information of the coefficient $z_n$ held inside the coefficients calculator 108 temporarily (step S405). The coefficient 4 is given by the following Equation (6):

[Formula 6]

$$z_n = \frac{1}{a_n + jb_n} \quad \text{(Formula 6)}$$

The coefficient $z_n$ is also given by the following Equation (7) using the amplitude $m_n$ and the phase $\theta_n$:

[Formula 7]

$$z_n = \frac{1}{m_n} e^{-j\theta_n} \quad \text{(Formula 7)}$$

That is, the coefficients calculator 108 calculates a coefficient $z_n$ which is the reciprocal of the complex data $a_n + jb_n$ of the angular frequency $\omega_{m,n}$ of the test signal S. The coefficient $z_n$ is an inverse characteristic of the frequency characteristic of the transmitter 100.

Then the test signal generator 101 judges whether or not the sweep has reached the test signal $S_N$ which is the last angular frequency component (step S406). That is, the test signal generator 101 judges whether n≥N is satisfied or not.

If the sweep has not reached the last test signal $S_N$ yet, for a frequency analysis using the next test signal, the test signal generator 101 changes the angular frequency $\omega_{m,n}$ of the test signal $S_n$ (step S407). That is, "1" is added to variable n. The process then returns to step S402.

On the other hand, if the sweep has reached the last test signal $S_N$, the coefficients calculator 108 stores, in the LUT held by the memory 109, the information of coefficients $z_n$ of the respective angular frequencies $\omega_{m,1}$ to $\omega_{m,N}$ which are held therein temporarily (step S408).

According to the process of FIG. 5, frequency component of test signals $S_n$ of the respective angular frequencies $\omega_{m,n}$ are analyzed and coefficients $z_n$ are calculated, whereby the frequency characteristics can be corrected in such a manner that an amplitude characteristic and a phase characteristic of the test signals $S_n$ are taken into consideration. Since a modulated signal is generated from a corrected baseband signal, a signal having a flat amplitude characteristic and phase characteristic can be transmitted. Furthermore, since an inverse characteristic can be calculated easily because the reciprocal of a frequency characteristic of the transmitter 100 is used.

In the process of FIG. 5, as for the timing of writing of coefficients to the LUT, coefficients $z_n$ of all the angular frequencies $\omega_{m,1}$ to $\omega_{m,n}$ are calculated and then stored in the memory 109. That is, the coefficients calculator 108 stores calculated coefficients $z_n$ in the LUT after a sweep of the N angular frequencies $\omega_{m,n}$ of the test signals $S_n$. Alternatively, the coefficients calculator 108 may store a coefficient $z_n$ of each angular frequency $\omega_{m,n}$ in the memory 109 every time it is calculated.

Figure 6:
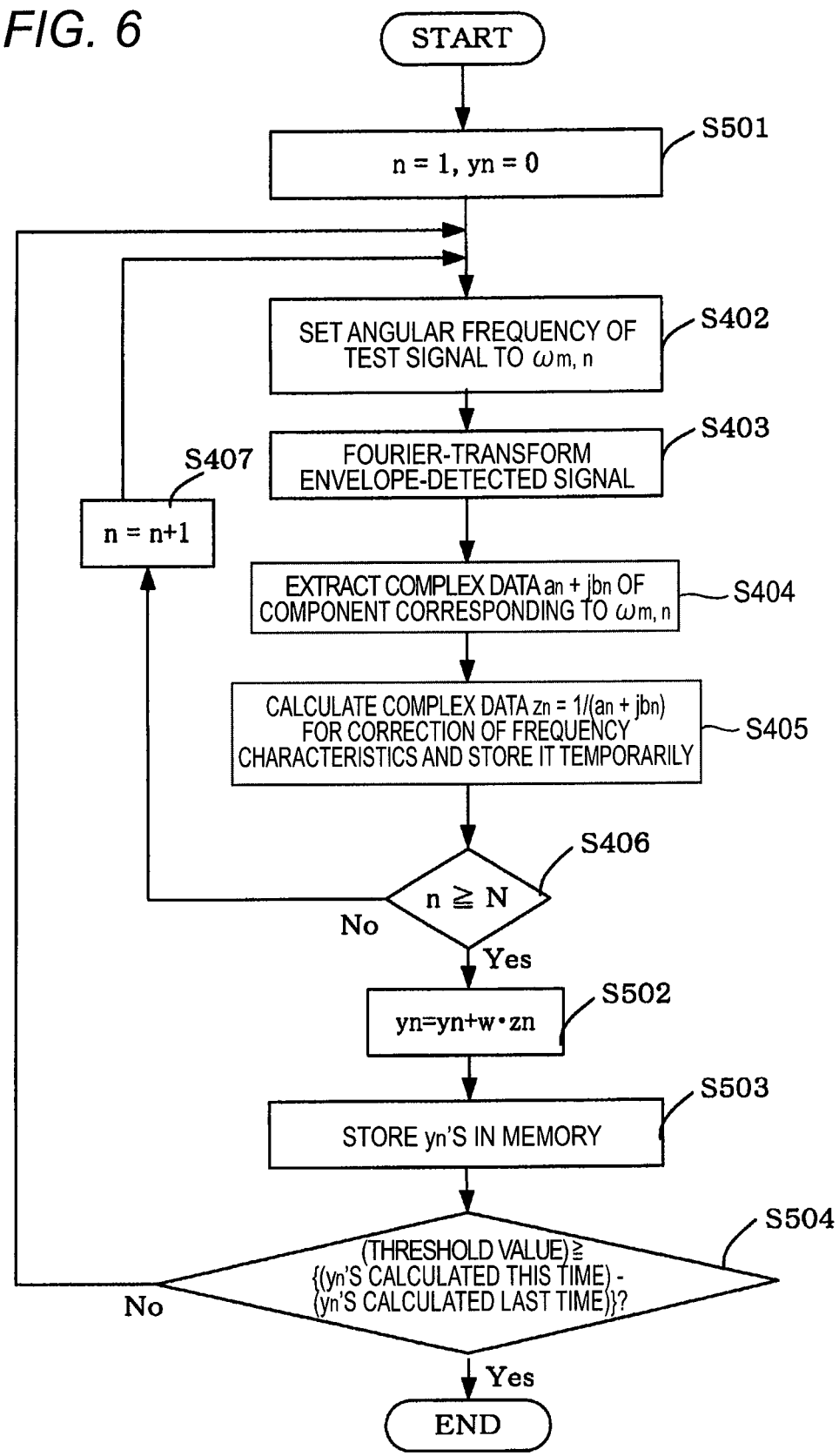
FIG. 6 is a flowchart of a second example operation for calculating correction coefficients in the transmitter according to the first embodiment of the disclosure.

FIG. 6 is a flowchart of a second example operation for calculating correction coefficients for correction of frequency characteristics on the basis of a test signal S in the transmitter 100. In the example of FIG. 6, while coefficients $z_n$ of the respective angular frequencies $\omega_{m,n}$ are calculated repeatedly, coefficients $y_n$ which are based on the coefficients $z_n$ are stored in the LUT. The coefficients $z_n$ are updated successively.

In FIG. 6, the coefficients $z_n$ are coefficients indicating residual errors of correction and are coefficients for calculation of coefficients $y_n$. The coefficients yn are correction coefficients. A coefficient w is a weighting coefficient in adding residual errors $z_n$ and is selected from a range of 0 to 1. For example, the coefficient w is set at 0.5.

First, the test signal generator 101 sets variable n to an initial value "1" and sets variables $y_n$ to initial values "0" (step S501).

Then the transmitter 100 executes the same steps S402-S406 as shown in FIG. 5. When one-round frequency characteristic analyses to the last test signal $S_N$ have been completed and coefficients $z_n$ have been calculated, the process moves to step S502.

The coefficients calculator 108 adds the calculated coefficients $z_n$ to the respective coefficients $y_n$ while giving the weight w to the former (step S502). More specifically, the coefficients calculator 108 calculates $y_n = y_n + w \times z_n$.

Subsequently, the coefficients calculator 108 stores the information of the calculated coefficients $y_n$ in the LUT which is held by the memory 109. If the LUT is already stored with information of coefficients $y_n$, it is updated by the new information.

The coefficients calculator 108 then calculates differences between the current coefficients $y_n$ with the coefficients $y_n$ calculated last time. The process is finished if the differences are smaller than or equal to a predetermined threshold value. The process returns to step S402 if the differences are larger than the predetermined threshold value (step S504).

In the process of FIG. 6, the coefficients calculator 108 updates the coefficients $y_n$ stored in the LUT while calculating coefficients $y_n$ as correction coefficients repeatedly. For example, the coefficients $y_n$ are updated by a result of adding weighted coefficients $z_n$ to them.

With the process of FIG. 6, the correction accuracy of the coefficients $y_n$ as correction coefficients is increased because coefficients $z_n$ of the respective angular frequency $\omega_{m,n}$ are calculated repeatedly. Since coefficients $z_n$ are calculated repeatedly and coefficients $y_n$ are calculated using the coefficient w, residual errors come closer to zero gradually and the correction accuracy is increased further.

Since a modulated signal is generated from a corrected baseband signal, a signal having a flat amplitude characteristic and phase characteristic can be transmitted.

Figure 7:
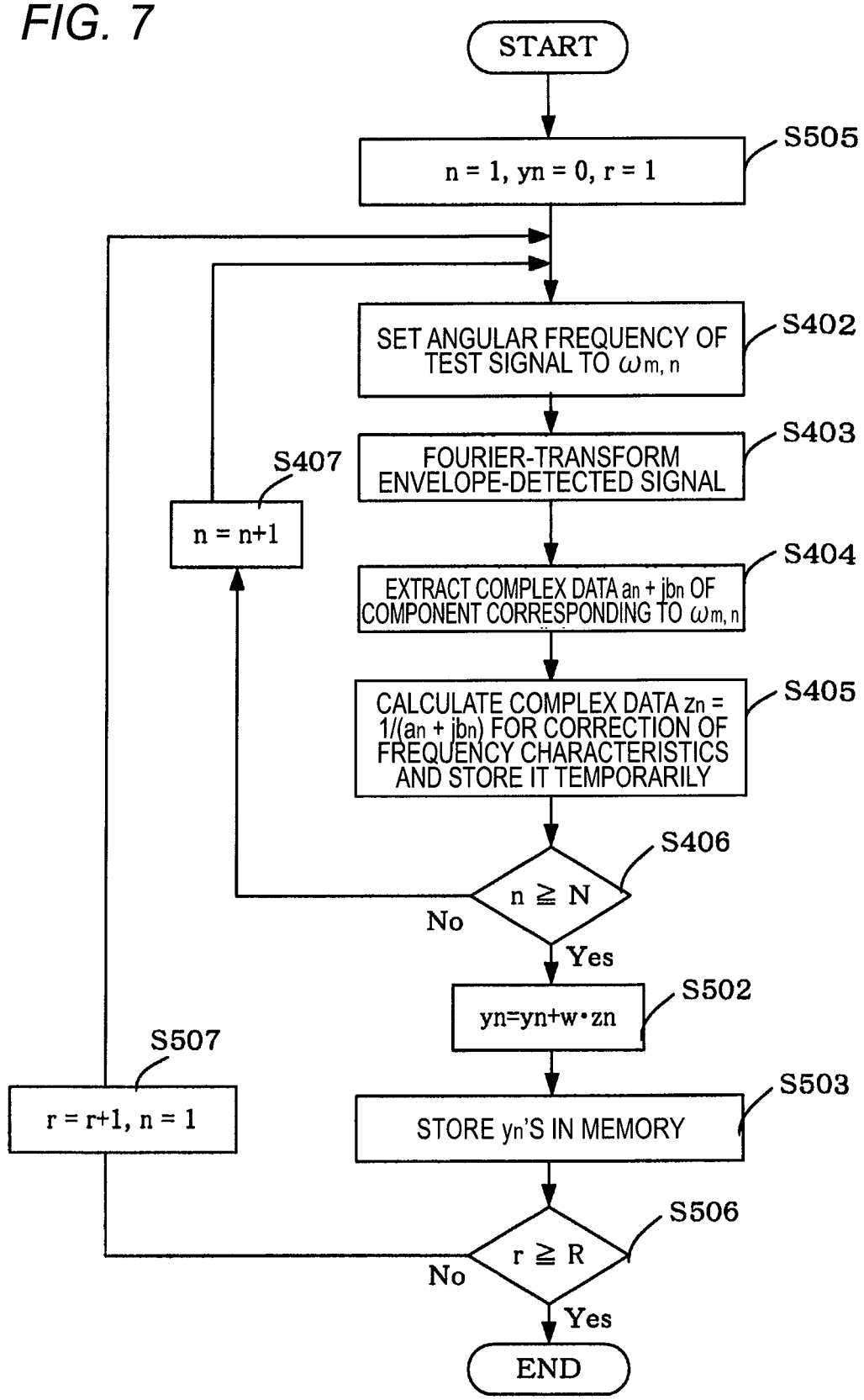
FIG. 7 is a flowchart of a third example operation for calculating correction coefficients in the transmitter according to the first embodiment of the disclosure.

FIG. 7 is a flowchart of a third example operation for calculating correction coefficients for correction of frequency characteristics on the basis of a test signal S in the transmitter 100. Differences from the process of FIG. 6 will be described. In FIG. 7, coefficients $z_n$ of the respective angular frequency $\omega_{m,n}$ are calculated repeatedly R times.

First, at step S505, the test signal generator 101 sets variable n to an initial value "1," sets variables $y_n$ to initial values "0," and sets variable r to an initial value "1."

At step S506, the coefficients calculator 108 judges whether or not coefficients $y_n$ have been calculated a prescribed number of times (R times). More specifically, the coefficients calculator 108 judges whether r≥R is satisfied or not.

If it is judged that coefficients $y_n$ have not been calculated R times yet, at step S507 the coefficients calculator 108 adds "1" to variable r and initializes variable n to "1." On the other hand, if it is judged that coefficients $y_n$ have been calculated R times, the transmitter 100 finishes the process of FIG. 7.

Next, a description will be made of a simulation of correction of frequency characteristics.

Figure 8:
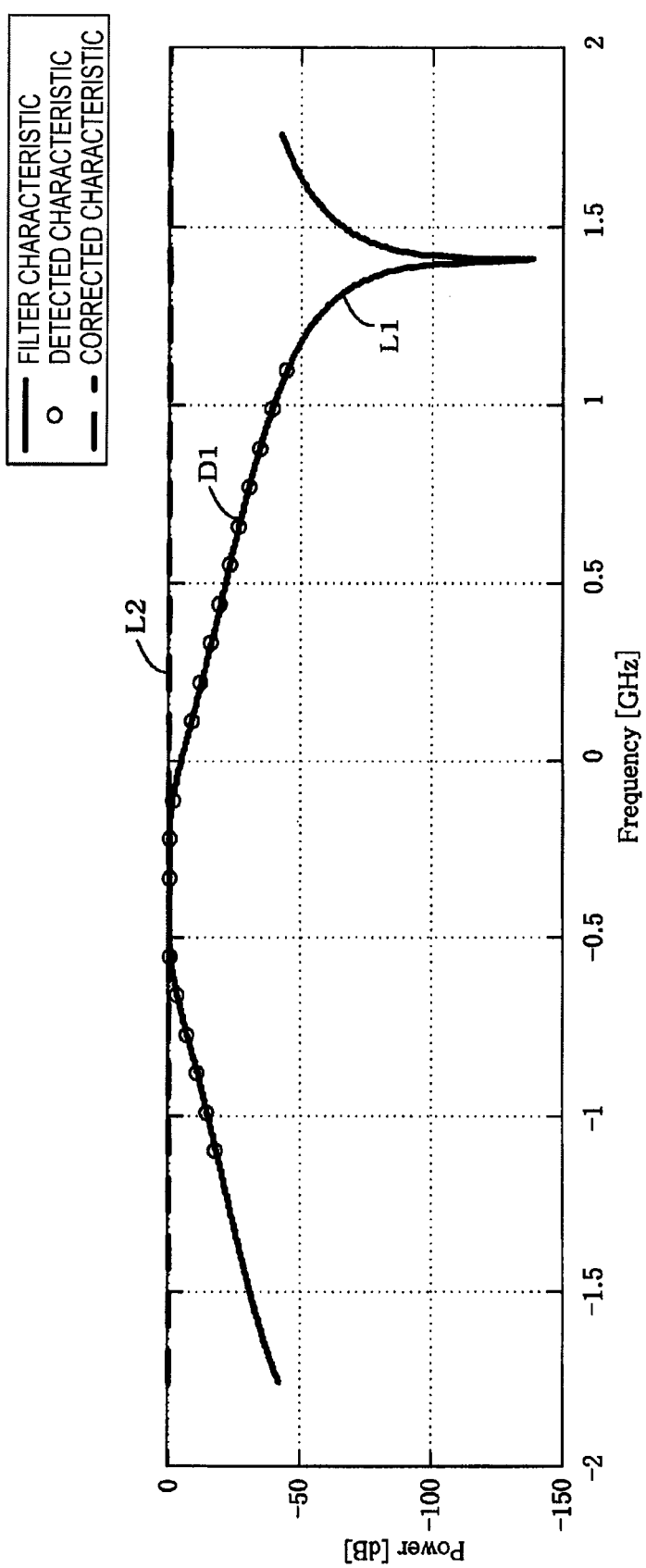
FIG. 8 shows a simulation result of an amplitude characteristic of a test signal in the first embodiment of the disclosure.
Figure 9:
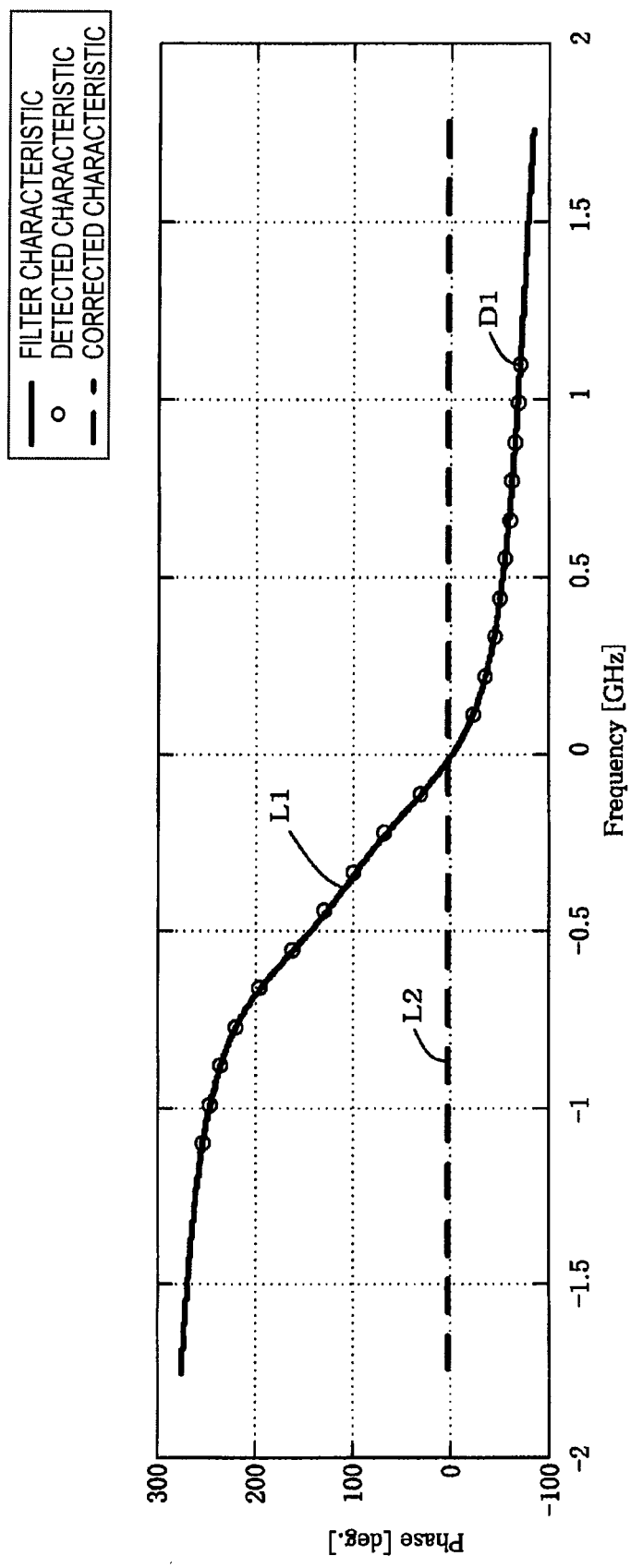
FIG. 9 shows a simulation result of an amplitude characteristic of the test signal in the first embodiment of the disclosure.

FIG. 8 shows a simulation result of an amplitude characteristic of a test signal. FIG. 9 shows a simulation result of a phase characteristic of the test signal. FIGS. 8 and 9 show results of a simulation performed according to the operation of FIG. 5, 6, or 7.

In the simulation, in generating a test signal, the test signal generator 101 sets the sampling frequency to 3.52 GHz and sets the coefficients K and d used in Equations (3) to 1 and 0.1, respectively. The test signal generator 101 sweeps $f_m$ (=$2\pi\omega_m$) in a range of −1.1 to +1.1 GHz at intervals of 100 MHz.

A second-order Butterworth filter in which the cutoff frequency is 300 MHz and the pass frequency is shifted to the negative direction by 352 MHz is assumed as a filter that simulates the frequency characteristics of the transmitter 100.

In FIGS. 8 and 9, the solid line L1 represents a characteristic of the filter and white circles D1 represent a frequency characteristic (detected characteristic) of the test signal measured by the frequency characteristics calculator 107. It is seen from FIGS. 8 and 9 that the filter characteristic and the detected characteristic coincide with each other. Therefore, it is confirmed that an amplitude characteristic and a phase characteristic can be detected accurately by the detection system of the transmitter 100.

In FIGS. 8 and 9, the broken line L2 represents a frequency characteristic (corrected characteristic) of a signal as corrected by the frequency characteristics corrector 104 after calculation of correction coefficients. The broken line L2 representing a phase characteristic coincides with the line of "0." That is, when a signal is corrected by the frequency characteristics corrector 104 using correction coefficients which represent an inverse characteristic and a resulting corrected signal is modulated, a signal to be transmitted comes to have a flat phase characteristic and amplitude characteristic.

Furthermore, frequency characteristics can be analyzed properly even for a filter characteristic that is offset from the center of a measurement frequency range and is not symmetrical.

Next, a description will be made of a case that the frequency characteristics of the transmitter 100 are corrected so as to have a linear phase characteristic.

Figure 10:
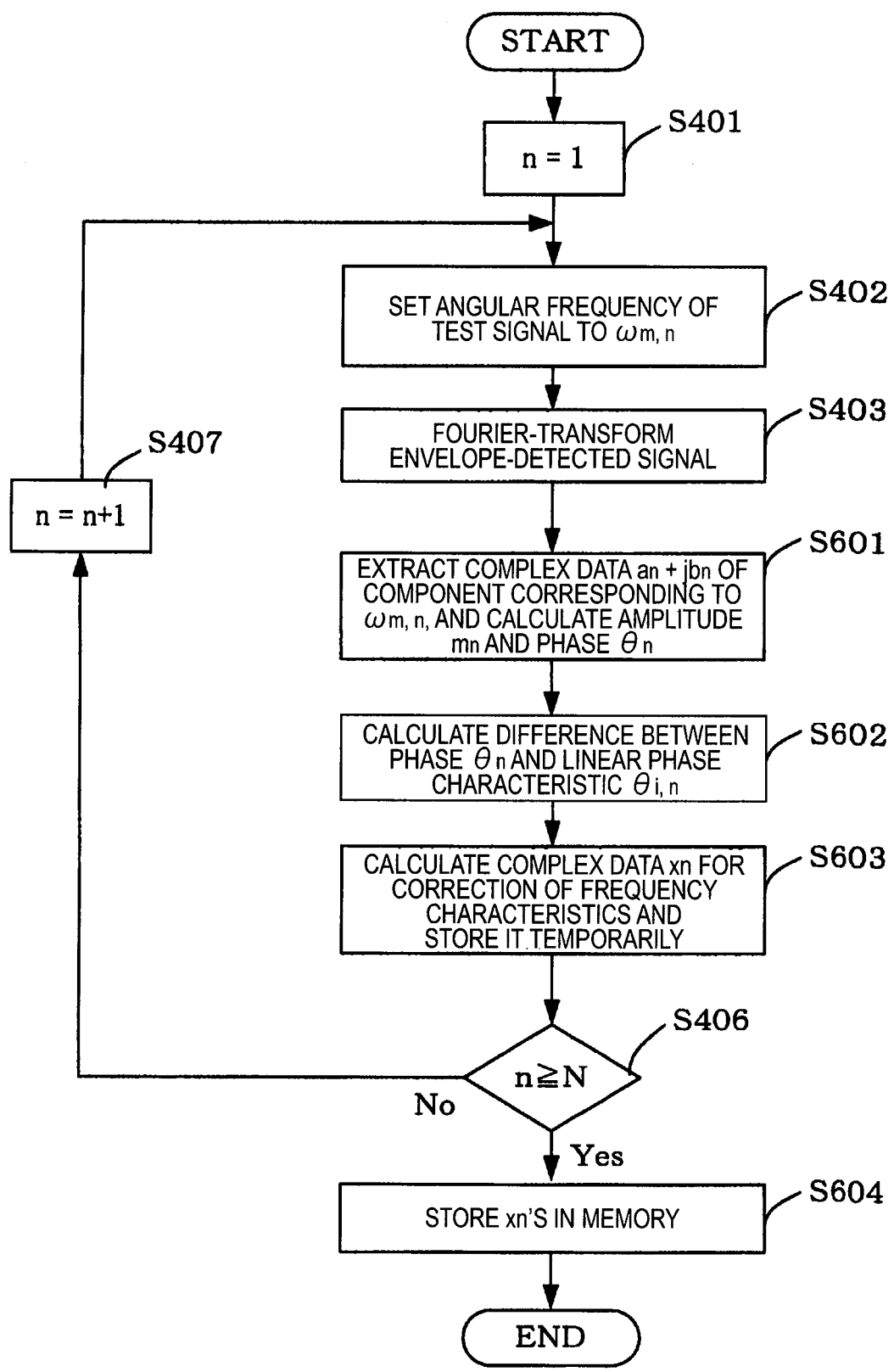
FIG. 10 is a flowchart of a fourth example operation for calculating correction coefficients in the transmitter according to the first embodiment of the disclosure.

FIG. 10 is a flowchart is a flowchart of a fourth example operation for calculating correction coefficients for correction of frequency characteristics on the basis of a test signal S in the transmitter 100. In FIG. 10, coefficients $x_n$ are correction coefficients. In the example of FIG. 10, correction is made so as to attain a linear phase characteristic instead of making correction until a signal that is output from the transmitter 100 exhibits a flat phase characteristic (equivalent to the characteristic represented by the broken line L2 in FIG. 9).

First, the same steps S401-S403 as shown in FIG. 5 are executed. The process moves to step S601 upon completion of Fourier transform on a test signal of an angular frequency $\omega_{m,n}$.

The frequency characteristics calculator 107 extracts component complex data $a_n+jb_n$ of the angular frequency $\omega_{m,n}$ the IQ plane. The frequency characteristics calculator 107 calculates an amplitude $m_n$ and a phase $\theta_n$ from the extracted data $a_n+jb_n$ according to Equations (4) and (5), respectively (step S601).

Then the coefficients calculator 108 calculates a difference $\Delta\theta_n$ between the phase $\theta_n$ and a linear phase characteristic $\theta_{i,n}$, that is, calculates $\Delta\theta_n=\theta_n-\theta_{i,n}$. The linear phase characteristic $\theta_{i,n}$ is a characteristic that the phase decreases linearly as the frequency increases (see FIG. 11). The information of the linear phase characteristic $\theta_{i,n}$ is held by the memory 109 in advance.

The coefficients calculator 108 then calculates a coefficient $x_n$ which is complex data for correction of the frequency characteristics of the transmitter 100, and has the information of the coefficient $x_n$ held inside the coefficients calculator 108 temporarily (step S405). The coefficient $x_n$ is given by the following Equation (8) using the amplitude $m_n$ and the phase difference $\Delta\theta_n$:

[Formula 8]

$$x_n = \frac{1}{m_n} e^{-j\Delta\theta_n} \qquad \text{(Formula 8)}$$

That is, the coefficients calculator 108 calculates a coefficient $x_n$ as a correction coefficient on the basis of the amplitude $m_n$ and the difference between the phase $\theta_n$ of the component complex data and the linear phase characteristic $\theta_{i,n}$ of the angular frequency $\omega_{m,n}$ of the test signal S and the linear phase characteristic $\theta_{i,n}$.

In the transmitter 100, the phase of the test signal delays more as the frequency increases (see FIG. 9) because its transmission system usually has a positive delay time. The transmission system includes the test signal generator 101, the data generator 102, the MUX 103, the frequency characteristics corrector 104, and the modulator 105.

The process of FIG. 10 can produce such coefficients $x_n$ that the phase characteristic is made close to a linear phase characteristic taking a certain degree of phase delay into consideration instead of producing a characteristic that is completely inverse in phase to the frequency characteristics of the transmitter 100. Therefore, the transmitter 100 can produce a satisfactory amplitude characteristic and phase characteristic without the need for preparing a filter having a negative delay time.

Since it suffices to correct the phase characteristic of an output signal of the transmitter 100 into a linear phase characteristic, the amount of calculation can be made smaller than in the case of generating correction amounts of an inverse characteristic, which enables effective use of a time resource and a bit width resource. Therefore, even in the case where a frequency characteristic having steep variations at particular frequencies as in quantization noise is included, the correction accuracy can be increased by making correction into a linear phase characteristic by using one parameter ($\Delta\theta_n$).

Figure 11:
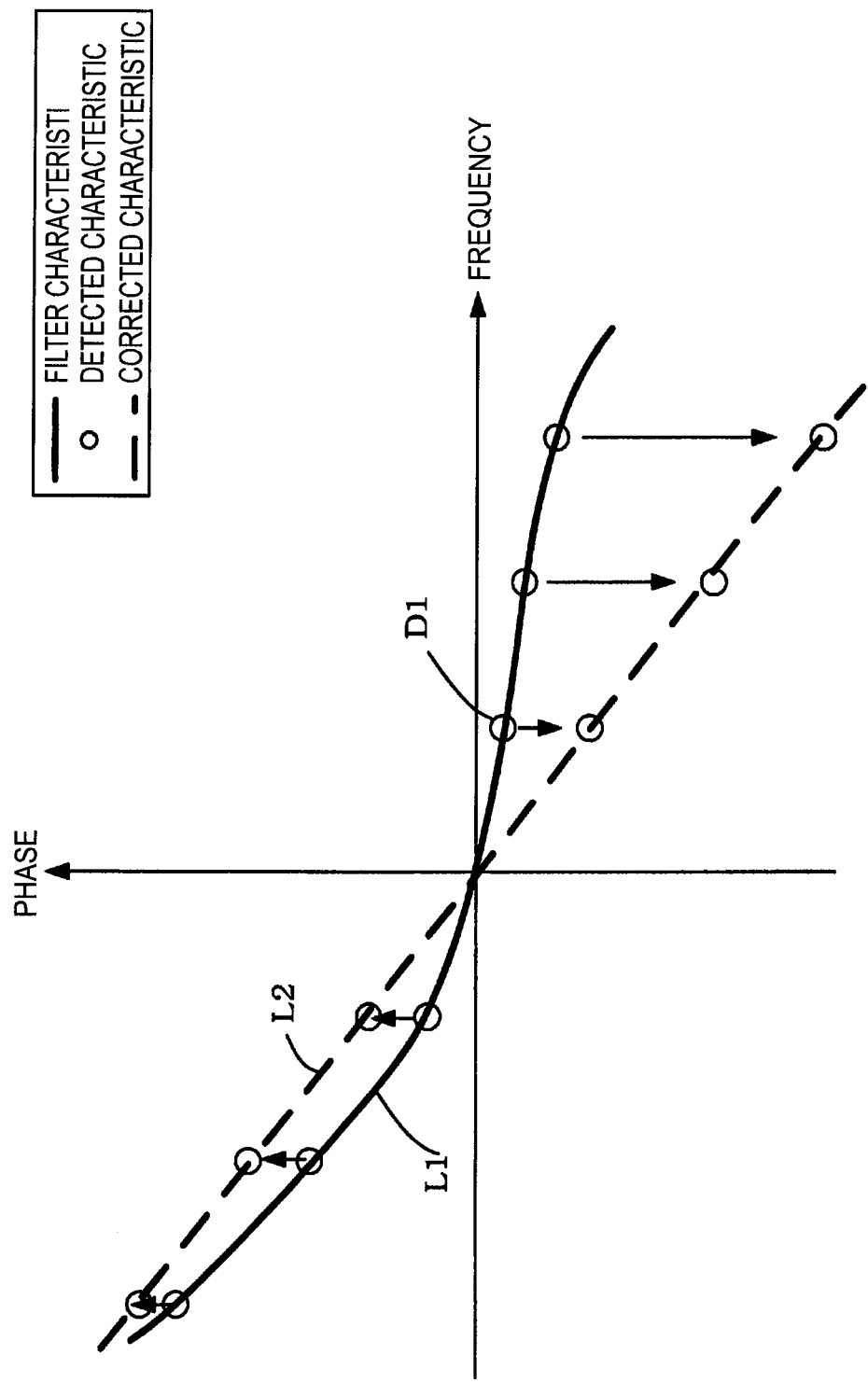
FIG. 11 is a graph showing an image of correction of the phase characteristic of a test signal into a linear phase characteristic in the first embodiment of the disclosure.

FIG. 11 is a graph showing an image of correction of the phase characteristic of a test signal into a linear phase characteristic.

In FIG. 11, the solid line L1 represents a filter characteristic of a filter that simulates the frequency characteristics of the transmitter 100. White dots D1 represent a detected characteristic. The broken line L2 represents a linear phase characteristic, that is, a corrected characteristic as corrected using coefficients $x_n$ calculated at prescribed frequencies by the process of FIG. 10.

Next, a modification of the frequency characteristics corrector 104 will be described.

Figure 12:
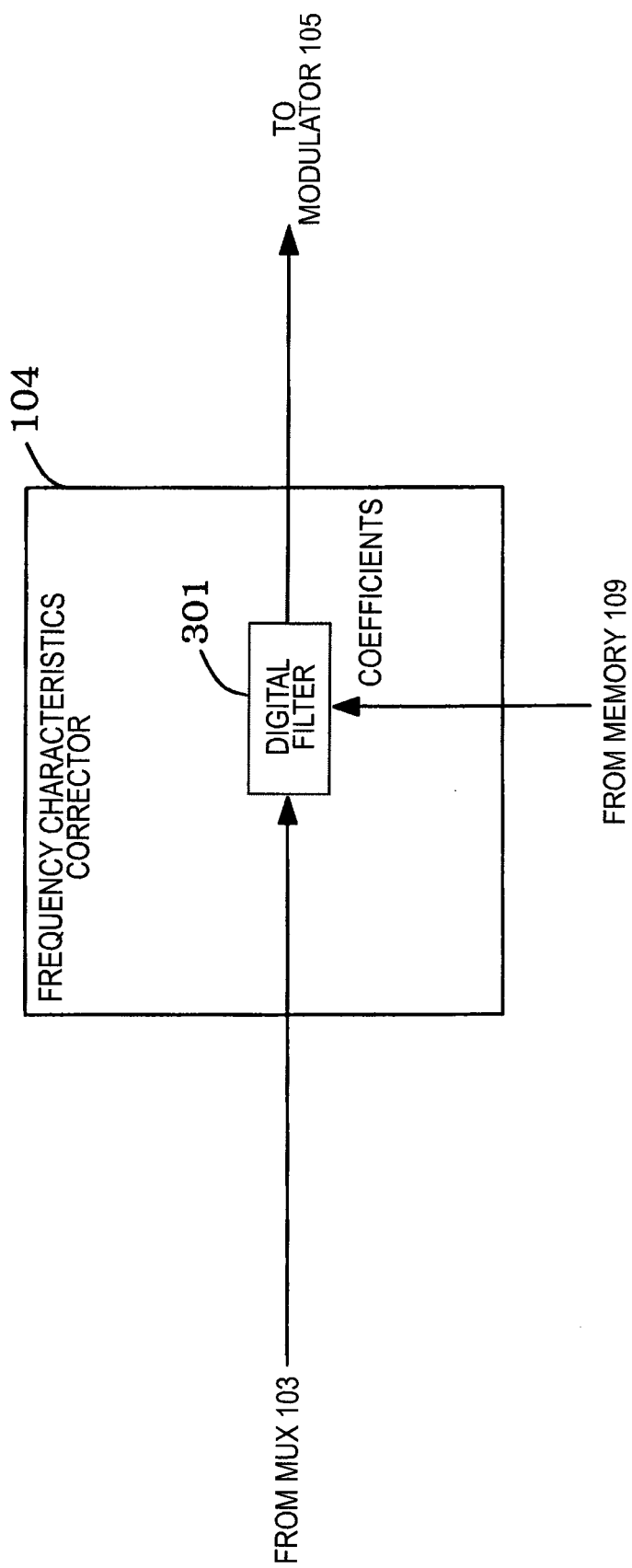
FIG. 12 is a block diagram showing a modified configuration of the frequency characteristics corrector used in the first embodiment of the disclosure.

FIG. 12 is a block diagram showing a modified configuration of the frequency characteristics corrector 104.

In FIG. 12, the frequency characteristics corrector 104 is equipped with a digital filter 301. Where the digital filter 301 is used, coefficients of the digital filter 301 are stored in the LUT. For example, coefficients of the digital filter 301 may be calculated by inverse-Fourier-transforming coefficients $z_n$ (correction coefficients) in the coefficients calculator 108.

Where the digital filter 301 is provided, the configuration can be simplified because it is not necessary that the frequency characteristics corrector 104 be provided with a Fourier transformer and an inverse Fourier transformer.

Next, a description will be made of how the transmitter 100 operates after completion of the calibration.

After completion of the calibration, the transmitter 100 finishes the calibration mode. Upon the finish of the calibration mode, the transmitter 100 switches to the data transmission mode. More specifically, the MUX 103 shown in FIG. 1 selects the output of the data generator 102.

Then the frequency characteristics corrector 104 corrects an IQ signal that is output from the data generator 102 by referring to the LUT in which the correction coefficients calculated by the coefficients calculator 108 are stored. Subsequently, the modulator 105 modulates a corrected signal and a modulated signal is transmitted.

The transmitter 100 can correct the amplitude characteristic and the phase characteristic of a signal with high accuracy and hence can reduce distortion of a transmission signal. For example, the correction of the frequency characteristics of the transmitter 100 is performed at the time of power-on of the transmitter 100 or its reactivation from a sleep mode or before the start of a data transmission.

As seen from the above description, the transmitter 100 can correct, with high accuracy, frequency characteristics caused by frequency conversion between a baseband signal and a high-frequency signal in, for example, wireless communications in a wide frequency band. Furthermore, a transmitter can be realized in which an amplitude characteristic, a phase characteristic, and frequency characteristics are compensated so as to become flat in wireless communications in a wide frequency band.

Next, a wireless apparatus 400 including the transmitter 100 will be described.

Figure 13:
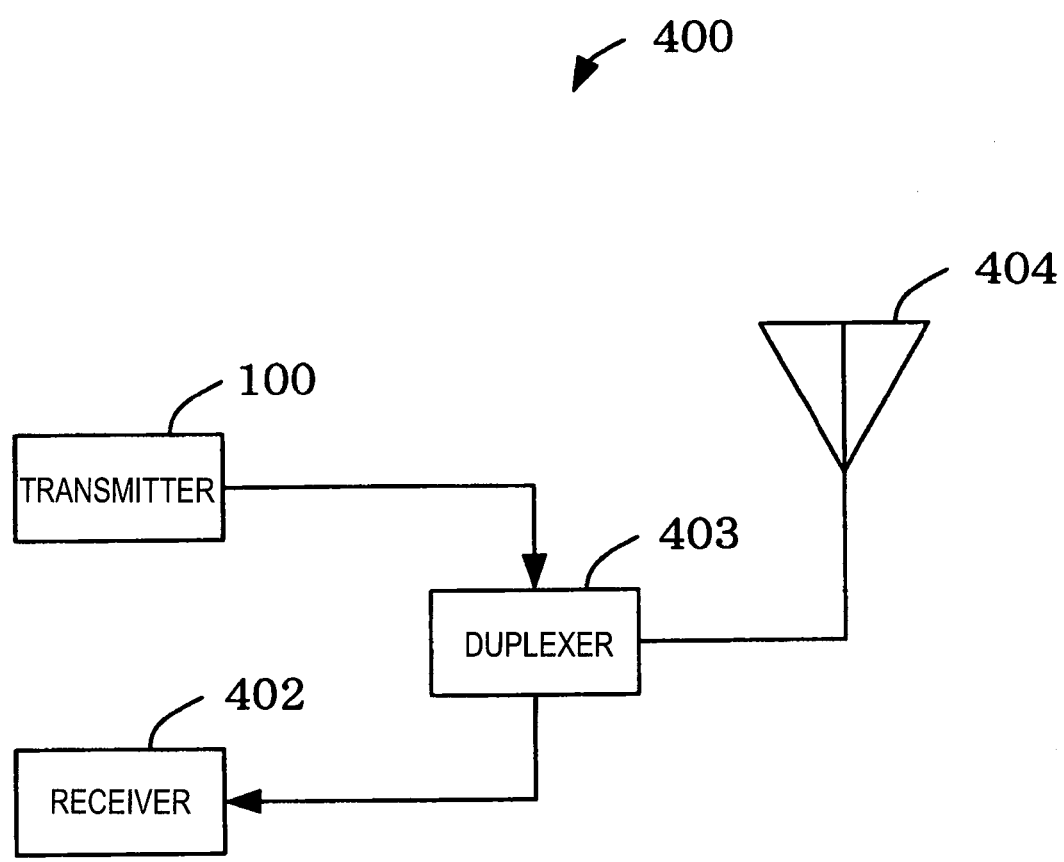
FIG. 13 is a block diagram showing an example configuration of a first wireless apparatus according to the first embodiment of the disclosure.

FIG. 13 is a block diagram showing an example configuration of the wireless apparatus 400. The wireless apparatus 400 is equipped with the transmitter 100, a receiver 402, a duplexer 403, and an antenna 404.

The transmitter 100 corrects frequency characteristics, modulates desired data, and transmits a modulated signal. The receiver 402 receives data from another communication apparatus. The duplexer 403 separates a transmission signal and a reception signal from each other, whereby the antenna 404 is shared by transmission and reception.

The wireless apparatus 400 makes it possible to transmit data having only a low degree of distortion.

Figure 14:
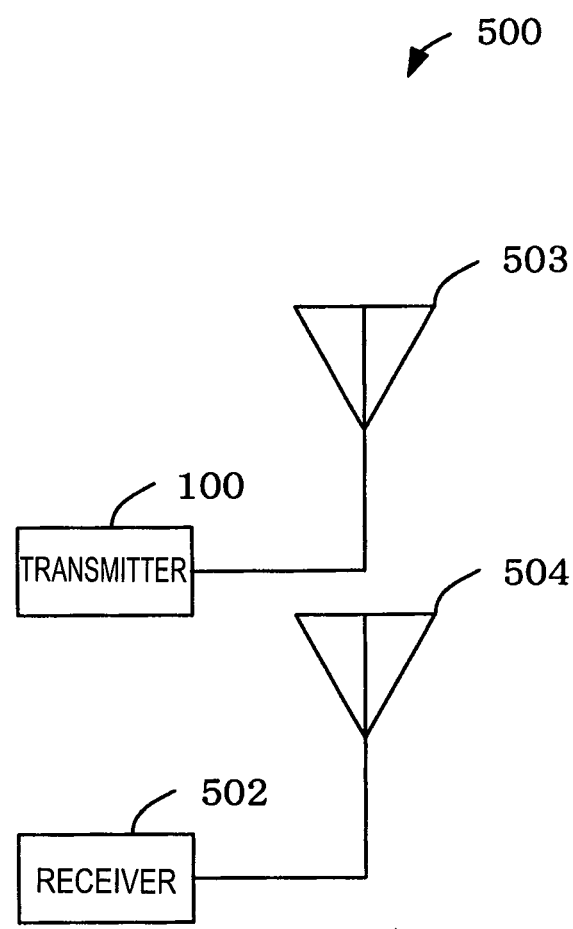
FIG. 14 is a block diagram showing an example configuration of a second wireless apparatus according to the first embodiment of the disclosure.

FIG. 14 shows another wireless apparatus 500 which is equipped with a transmission antenna 503 and a reception antenna 504 which are separate from each other.

(Circumstances Leading to Another Mode of Disclosure)

For example, conventional transmitters modulate a transmission signal using an I signal and a Q signal (also called an IQ signal) and output a modulated signal. Where the same digital values are set for an I signal and a Q signal, the modulation accuracy should be high if the I signal and the Q signal have a phase different of 90° and the same amplitude. However, in practice, since transmitters include an analog circuit, an I signal and a Q signal are different from each other in amplitude and their phase difference may deviate from 90°. Transmitters calibrate an IQ signal in the digital domain to make it closer to a desired state.

There is a conventional transmitter described below. This transmitter uses a sinusoidal single-sideband signal as a test signal. An envelope-detected signal is subjected to a frequency analysis and a phase of a frequency-analyzed signal is determined. The transmitter determines directivity of a gain error and a phase error from the thus-determined phase and performs calibration (refer to Referential patent document, for example).

Referential patent document: U.S. Pat. No. 7,881,402

An envelope detector which detects an envelope of a signal is used for calibrating an IQ signal. The envelope detector is formed using a wave detection diode, for example. In transmitters, an AD (analog-to-digital) converter which receives an output of the envelope detector is disposed downstream of the envelope detector.

In conventional transmitters, to increase the accuracy of IQ signal calibration, it is desirable to determine a reference phase. However, it is unclear how to determine a reference phase. For example, an example test signal for determining a reference phase of 0° is a test signal (I=cos $\omega_m$t, Q=0) in which the gain error is made extremely large. Since the test signal has a wide dynamic range, the detection system is required to have a wide dynamic range. That is, the wave detection diode is required to have a wide detection range or the AD converter is required to have a large number of bits.

In handling a signal in a relatively narrow frequency band (e.g., 1 GHz band), the modulation frequency of the AD converter can be set low and the number of bits that can be handled by the AD converter (dynamic range, vertical resolution) can be increased. In the AD converter, the number of bits that can be handled can be increased as the frequency band becomes narrower because a tradeoff relationship exists between the frequency band of an input signal and the number of bits. Therefore, it is highly probable that a signal in a relatively narrow frequency band can be detected correctly.

On the other hand, in handling a signal in a relatively wide frequency band (e.g., 60 GHz band), it is necessary to set the modulation frequency of the AD converter high and hence the number of bits that can be handled by the AD converter becomes small. Therefore, for a test signal having a wide dynamic range, it is difficult to determine an accurate reference phase because of lowered detection accuracy and the accuracy of the IQ calibration becomes insufficient.

A transmitter, a signal generation device, and a signal generation method which can increase the IQ calibration accuracy will be hereinafter described.

Embodiment 2

Figure 15:
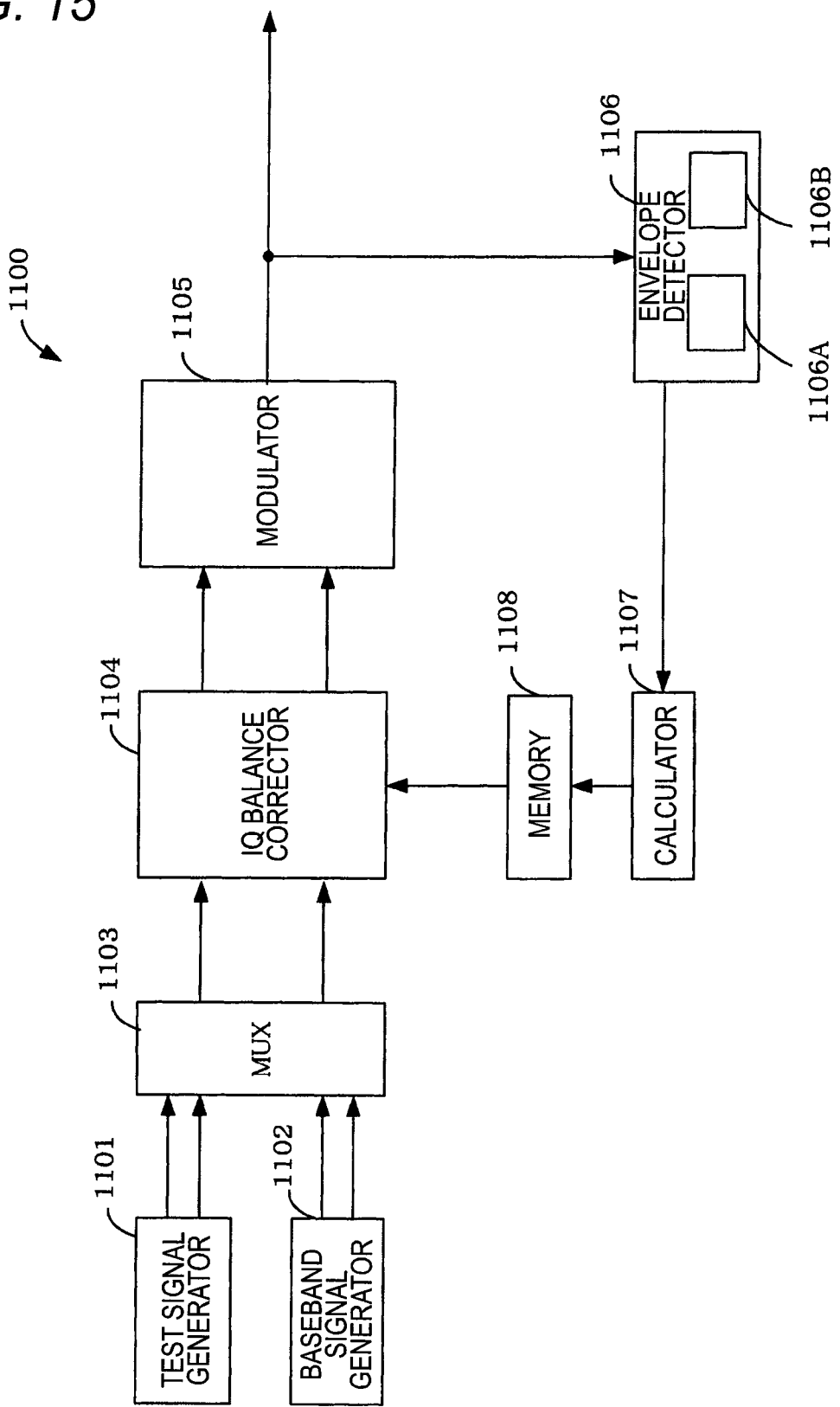
FIG. 15 is a block diagram of a transmitter according to a second embodiment of the disclosure.

FIG. 15 is a block diagram showing an example configuration of a transmitter 1100 according to a second embodiment of the disclosure. The transmitter 1100 is equipped with a test signal generator 1101, a baseband signal generator 1102, an MUX (multiplexer) 1103, an IQ imbalance corrector 1104, a modulator 1105, an envelope detector 1106, a calculator 1107, and a memory 1108.

The test signal generator 1101 generates a test signal for measurement of IQ imbalance and outputs it to the MUX 103. The test signal generator 1101 generates a test signal according to a detectable range of the envelope detector 1106. A test signal generation method will be described later in detail.

The baseband signal generator 1102 generates a baseband signal to be used for a communication and outputs it to the MUX 1103.

The MUX 1103 selects the test signal or the baseband signal, and outputs the selected signal to the IQ imbalance corrector. The MUX 1103 selects the output of the test signal generator 1101 in a calibration mode (i.e., in calibrating the IQ signal), and selects the output of the baseband signal generator 1102 in a data transmission mode (i.e., in transmitting the baseband signal).

The IQ imbalance corrector 1104 corrects the received IQ signal on the basis of parameters (correction coefficients) stored in an LUT (lookup table) which is held by the memory 1108, and outputs a resulting corrected signal to the modulator 1105. IQ imbalance is corrected in the correction performed by the IQ imbalance corrector 1104. The IQ imbalance includes an amplitude error and a phase error.

The modulator 1105 modulates the corrected signal that is output from the IQ imbalance corrector 1104, and outputs a resulting modulated signal (high-frequency signal).

The envelope detector 1106 includes an envelope detector 1106A and an AD converter 1106B which is disposed downstream of the envelope detector so as to be connected to it in series. The envelope detector 1106A, which is formed by using a wave detection diode, detects an envelope of the high-frequency signal that is output from the modulator 1105. The AD converter 1106B converts the analog signal as the envelope detection result into a digital signal, and outputs the digital signal (envelope signal) to the calculator 1107.

The calculator 1107 detects IQ imbalance by analyzing the envelope signal. And the calculator 1107 calculates correction coefficients for correction of the IQ imbalance and updates the LUT which is held by the memory 1108. That is, the calculator 1107 has a function of a correction coefficients processor for calculating correction coefficients on the basis of the envelope detected by the envelope detector 1106.

The calculator 1107 realizes its functions by running programs that are stored in a memory (not shown). How the calculator 1107 operates will be described later in detail.

The memory 1108 has the LUT and stores various data and parameters. The various parameters include a matrix c which includes correction coefficients.

The test signal generator 1101, the baseband signal generator 1102, the MUX 1103, the IQ imbalance corrector 1104, the calculator 1107, and the memory 1108 may be implemented as a first integrated circuit, and the modulator 1105 and the envelope detector 1106 may be implemented as a second integrated circuit. Alternatively, all the constituent units of the transmitter 1100 may be implemented as a single integrated circuit.

Next, the IQ imbalance corrector 1104 will be described.

For example, the matrix c which is used for the IQ imbalance correction is given by the following Equation (9) which uses values $g_c$ and $\theta_c$. The value $g_c$ is a value to contribute to correction of an amplitude error $g_e$, and the value $\theta_c$ is a value to contribute to correction of a phase error $\theta_e$.

[Formula 9]

$$c = \begin{pmatrix} \dfrac{\cos\dfrac{\theta_c}{2}}{(1-g_c)\cos\theta_c} & \dfrac{-\sin\dfrac{\theta_c}{2}}{(1-g_c)\cos\theta_c} \\ \dfrac{-\sin\dfrac{\theta_c}{2}}{(1+g_c)\cos\theta_c} & \dfrac{\cos\dfrac{\theta_c}{2}}{(1+g_c)\cos\theta_c} \end{pmatrix} \quad \text{(Formula 9)}$$

When the amplitude error $g_e$ and the phase error $\theta_e$ are sufficiently small, the values $g_c$ and $\theta_c$ also become small and the matrix c can be approximated by the following Equation (10):

[Formula 10]

$$c = \begin{pmatrix} 1+g_c & -(1+g_c)\dfrac{\theta_c}{2} \\ -(1-g_c)\dfrac{\theta_c}{2} & -(1-g_c) \end{pmatrix} \quad \text{(Formula 10)}$$

Figure 16:
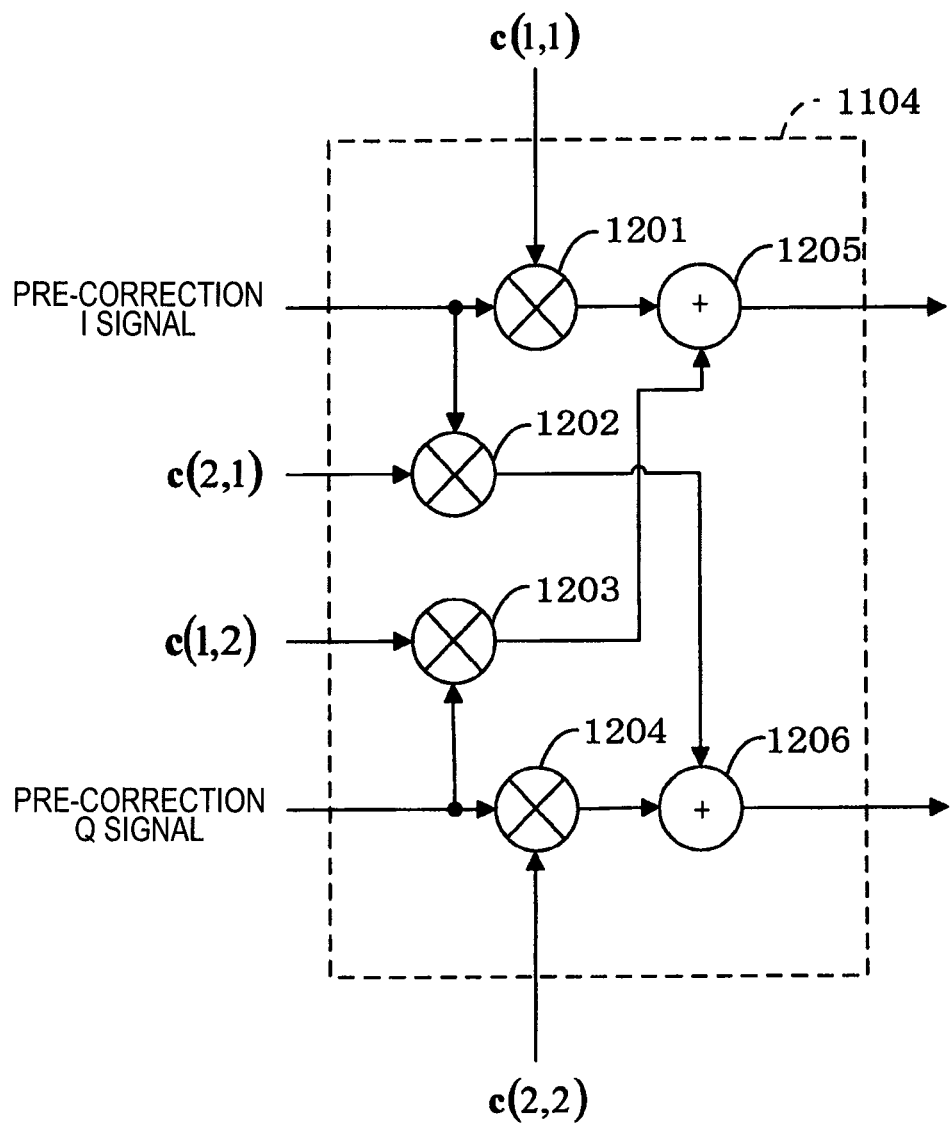
FIG. 16 is a block diagram showing an example detailed configuration of an IQ imbalance corrector used in the second embodiment of the disclosure.

FIG. 16 is a block diagram showing an example detailed configuration of the IQ imbalance corrector 1104.

For example, the IQ imbalance corrector 1104 includes multipliers 1201, 1202, 1203, and 1204 and adders 1205 and 1206.

The multiplier 1201 receives an I signal (pre-correction I signal) that is output from the MUX 1103 and a correction coefficient c(1, 1) that is stored in the LUT, and multiplies them together. The multiplier 1202 receives the I signal (pre-correction I signal) that is output from the MUX 1103 and a correction coefficient c(2, 1) that is stored in the LUT, and multiplies them together. The multiplier 1203 receives a Q signal (pre-correction Q signal) that is output from the MUX 1103 and a correction coefficient c(1, 2) that is stored in the LUT, and multiplies them together. The multiplier 1204 receives the Q signal (pre-correction Q signal) that is output from the MUX 1103 and a correction coefficient c(2, 2) that is stored in the LUT, and multiplies them together.

The adder 1205 receives outputs of the multipliers 1201 and 1203 and outputs a corrected I signal (post-correction I signal). The adder 1206 receives outputs of the multipliers 1202 and 1204 and outputs a corrected Q signal (post-correction Q signal).

Next, the modulator 1105 will be described.

Figure 17:
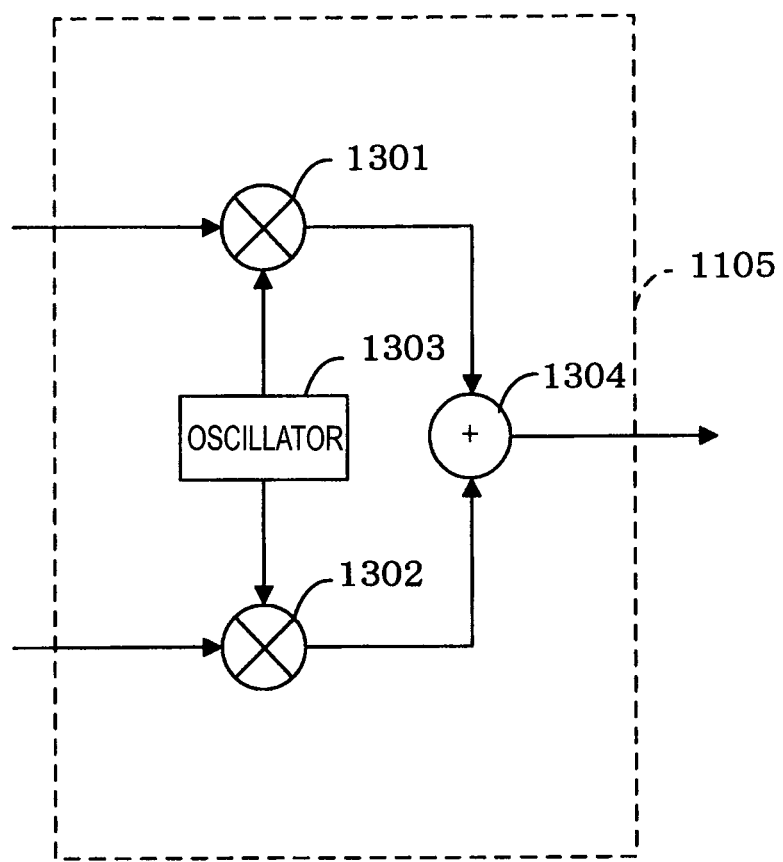
FIG. 17 is a block diagram showing an example detailed configuration of a modulator used in the second embodiment of the disclosure.

FIG. 17 is a block diagram showing an example detailed configuration of the modulator 1105.

The modulator 1105 includes multipliers 1301 and 1302, an oscillator 1303, and an adder 1304.

The multiplier 1301 receives the corrected I signal (post-correction I signal) that is output from the IQ imbalance corrector 1104 and an output of the oscillator 1303, and multiplies them together. The multiplier 1302 receives the corrected Q signal (post-correction Q signal) that is output from the IQ imbalance corrector 1104 and an output of the oscillator 1303, and multiplies them together.

The oscillator 1303 generates a continuous wave signal, gives a phase difference of 90° to two continuous wave signals, and supplies the resulting signals to the respective multipliers 1301 and 1302. The adder 1304 receives outputs of the multipliers 1301 and 1302 and adds them together.

An output of the adder 1304 is a modulated signal, that is, an output signal of the transmitter 1100. In the transmitter 1100, an amplifier may be provided downstream of the modulator 1105. The output signal of the transmitter 1100 is given by the following Equation (11) which uses the amplitude error $g_e$ and the phase error $\theta_e$.

[Formula 11]

$$V = A_O \left( (1-g_e)I e^{j\frac{\theta_e}{2}} + j(1+g_e)Q e^{-j\frac{\theta_e}{2}} \right) e^{j\omega t} \quad \text{(Formula 11)}$$

Next, the test signal generator 1101 will be described.

There are two kinds of test signals, that is, a first test signal S10 and a second test signal S20. The first test signal S10 is a signal for measurement of a reference phase of a signal generated by the transmitter 1100. The second test signal S20 is a signal for measurement of a measurement phase of the signal generated by the transmitter 1100.

First, the first test signal S10 will be described.

For example, the test signal generator 1101 outputs, as the first test signal S10, a first test signal S11 which is given by the following Equations (12) and is a signal for determination of a reference phase of 0°.

[Formulae 12]

$$\begin{cases} I = A(1 + \alpha\cos(2\omega_m t)) \\ Q = 0 \end{cases} \quad \text{(Formula 12)}$$

In Equations (12), A and α are constants and $\omega_m$ is the angular frequency of a second test signal (single-sideband signal, described later). Constant α is determined by the magnitude of IQ imbalance in the transmitter 1100 and residual IQ imbalance that is permitted after IQ imbalance correction. The same applies to Equations to appear below.

Figure 18:
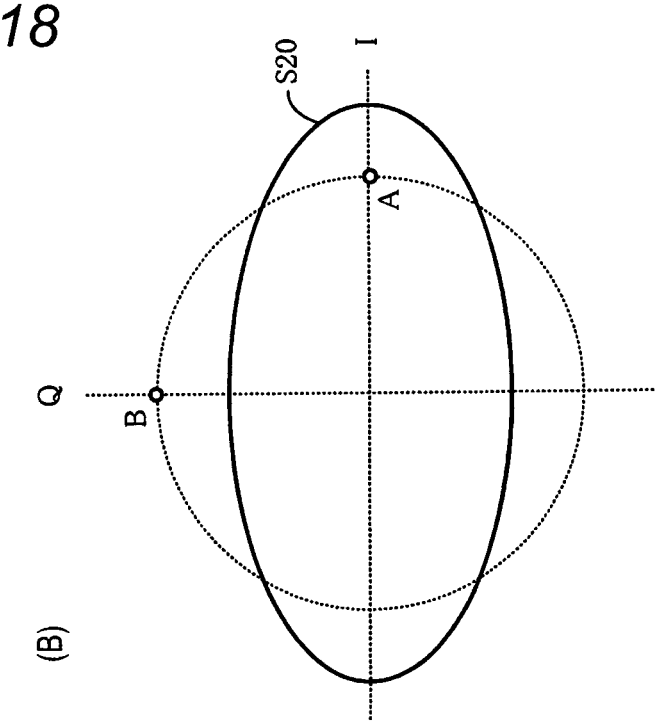
FIGS. 18(A) and 18(B) show examples of a first test signal and a second test signal in the IQ plane in the second embodiment of the disclosure.
Figure 18:
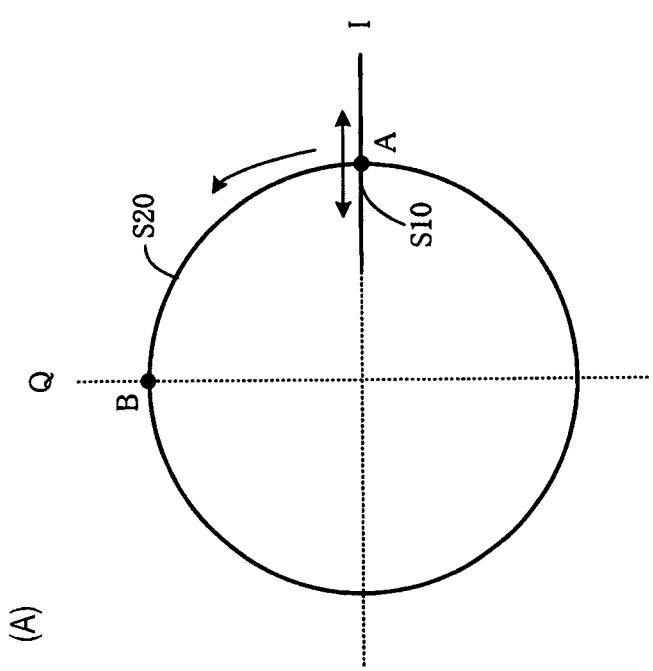

In the IQ plane, at t=0 the first test signal S11 which is given by Equations (12) starts oscillating from (I, Q)=(A(1+β), 0) (point A shown in FIG. 18(A)) toward the negative side of the I axis with an amplitude Aα. That is, it is different from a simple test signal that oscillates with the origin (0, 0) as the center in being offset by a distance A. Therefore, the first test signal S11 that is input to the envelope detector 1106A can be detected properly if its amplitude A±Aβ falls within a detectable range D shown in FIG. 19.

For example, the test signal generator 1101 may output, as the first test signal S10, a first test signal S12 that is given by the following Equations (13), which makes it possible to determine a reference phase of 90°.

[Formulae 13]

$$\begin{cases} I = 0 \\ Q = A(1 + \alpha\cos(2\omega_m t)) \end{cases} \quad \text{(Formula 13)}$$

In the IQ plane, at t=0 the first test signal S12 starts oscillating from (I, Q)=(0, A(1+α)) (point B shown in FIG. 18(A)) toward the negative side of the Q axis with an amplitude Aα. That is, it is different from a simple test signal that oscillates with the origin as the center in being offset by a distance A in the Q-axis direction. Therefore, the first test signal S12 that is input to the envelope detector 1106A can be detected properly if its amplitude A±Aα falls within the detectable range D shown in FIG. 19.

For example, the test signal generator 1101 outputs, as the first test signal S10, a first test signal S13 which is given by the following Equations (14) and is a signal for determination of a reference phase of 180°.

[Formulae 14]

$$\begin{cases} I = A(1 - \alpha\cos(2\omega_m t)) \\ Q = 0 \end{cases} \quad \text{(Formula 14)}$$

In the IQ plane, at t=0 the first test signal S13 which is given by Equations (14) starts oscillating from (I, Q)=(A(1−α), 0) (point A shown in FIG. 18(A)) toward the positive side of the I axis with an amplitude Aα. That is, it is different from a simple test signal that oscillates with the origin (0, 0) as the center in being offset by a distance A in the I-axis direction. Therefore, the first test signal S13 that is input to the envelope detector 1106A can be detected properly if its amplitude A±Aα falls within the detectable range D shown in FIG. 19.

In Equations (12)-(14), the first test signals S11, S23, and S13 are IQ signals for an amplitude modulation (AM) signal, for example.

Next, the second test signal S20 will be described.

For example, the test signal generator 1101 outputs a second test signal S20 which is given by the following Equations (15):

[Formulae 15]

$$\begin{cases} I = A\cos(\omega_m t) \\ Q = A\sin(\omega_m t) \end{cases} \quad \text{(Formula 15)}$$

The second test signal S20 given by the following Equations (15) is an IQ signal for a single-sideband signal which rotates around the origin (0, 0) in the IQ plane. The angular frequency $\omega_m$ of the second test signal S20 is half of the angular frequency $2\omega_m$ of the first test signals S11-S13.

Here a description will be made of why the angular frequency $\omega_n$ of the second test signal S20 is set equal to half of the angular frequency $2\omega_m$ of the first test signals S11-S13.

FIG. 18(A) shows the first test signal S11 and an example ideal second test signal S20 in the IQ plane. FIG. 18(B) shows an example second test signal S20 in which in the IQ plane the I signal is larger than in the ideal state and the Q signal is smaller than in the ideal state. The first test signal S11 given by Equations (12) is shown in FIG. 18(A) as an example of the first test signal S10.

In FIG. 18(A), the first test signal S11 vibrates straightly in the IQ plane. The second test signal S20 rotates so as to form circles in the IQ plane. For example, in FIG. 18(B), if the second test signal S20 has distortion, its amplitude varies in order of large→small→large→small→large and the angular frequency varies two times as it makes one rotation in the IQ plane. Therefore, spurious noise occurs at a cycle that is half of the cycle of the second test signal S20.

On the other hand, the amplitude of the first test signal S11 varies in order of large→small→large and the angular frequency varies once in one cycle. Therefore, when the first test signal S11 is envelope-detected, spurious noise occurs at the same cycle as its cycle.

Therefore, the test signal generator 1101 generates the test signals so that the angular frequency $2\omega_m$ of the first test signal S11 becomes two times the angular frequency $\omega_m$ of the second test signal S20. That is, the frequency of the first test signal S10 becomes two times that of the second test signal S20.

Next, the envelope detector 1106 will be described.

Figure 19:
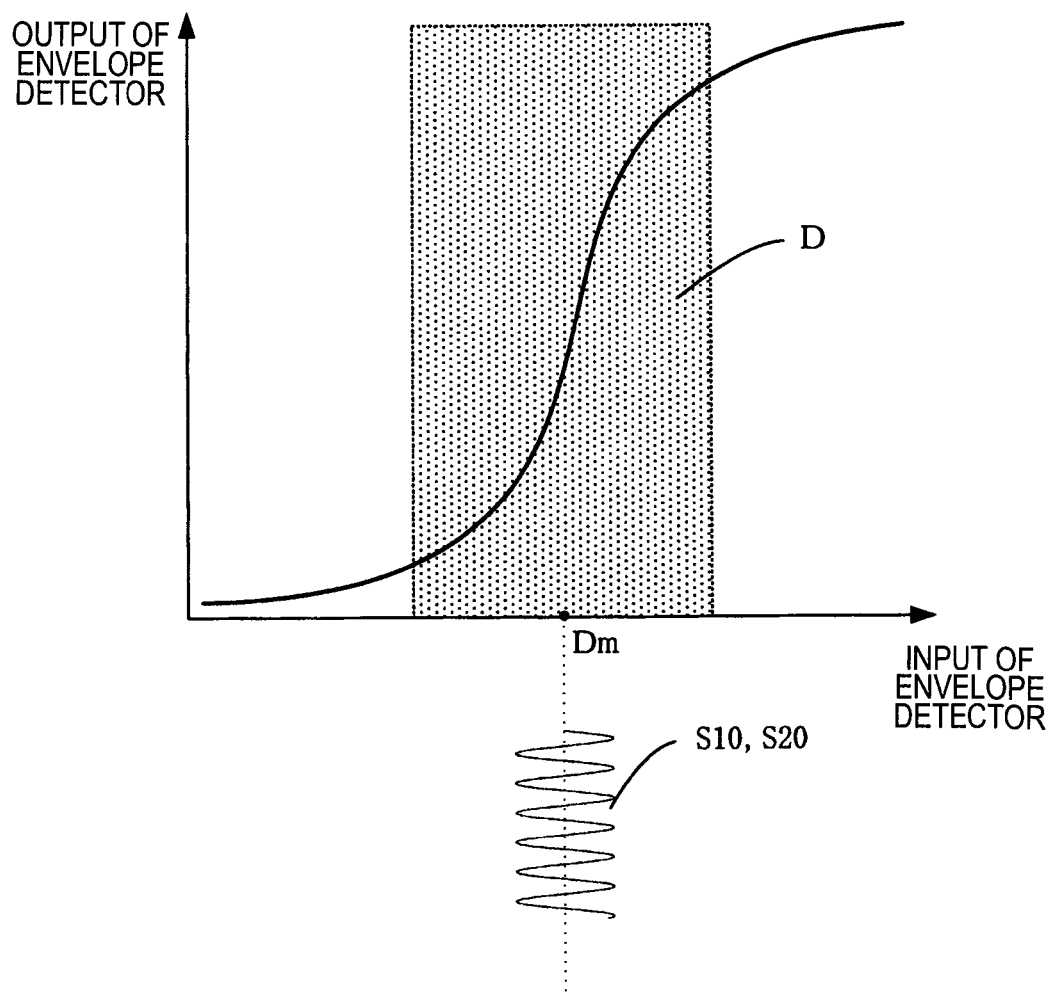
FIG. 19 shows an example input/output characteristic of an envelope detector used in the second embodiment of the disclosure.

FIG. 19 shows an example input/output characteristic of the envelope detector 1106A. The horizontal axis of FIG. 19 represents the magnitude of the input of the envelope detector 1106A and the vertical axis represents the magnitude of the output of the envelope detector 1106A, that is, the input of the AD converter 1106B. It is seen from FIG. 19 that the output of the envelope detector 1106A increases steeply in the detectable range D.

In FIG. 18(A), the first test signal S11 is offset from the origin O to point A on the I axis in the IQ plane. Therefore, whereas a test signal that moves on the I axis in the IQ plane so as to pass the origin O does not properly fall within the detectable range D, the first test signal S11 falls within the detectable range D properly.

Therefore, all the bits of the AD converter 1106B can be used and hence the detection accuracy of the envelope detector 1106A is increased. As a result, a reference phase can be detected accurately.

The test signal generator 1101 adjusts the constant A in each of Equations (12)-(14) which define the first test signal S10. More specifically, the test signal generator 1101 sets the center A (A, 0) (see FIG. 18(A)) of vibration of the first test signal S10 close to the center Dm of the detectable range D of the envelope detector 1106A according to the characteristic of the envelope detector 1106A.

Furthermore, the test signal generator 1101 adjusts the constant A in Equations (15) which defines the second test signal S20. More specifically, the test signal generator 1101 sets the center of vibration of the second test signal S20 close to the center Dm of the detectable range D of the envelope detector 1106A according to the characteristic of the envelope detector 1106A. The constant A of the second test signal S20 may have the same value as that of the first test signal S10.

The magnitude of a signal detected by the envelope detector 1106A corresponds to the absolute value of a resultant vector of the I signal and the Q signal. If the transmitter 1100 does not have IQ imbalance, the magnitude of an envelope of the second test signal S20 detected by the envelope detector 1106A is constant. On the other hand, if the transmitter 1100 has IQ imbalance, the magnitude of an envelope of the second test signal S20 detected by the envelope detector 1106A varies.

Therefore, whichever of the first test signal S10 and the second test signal S20 is to be detected, the envelope detector 1106A detects a waveform that vibrates with a point close to the center Dm of the detectable range D as a vibration center. The first test signal S10 and the second test signal S20 can also be made approximately the same in amplitude by setting a so that envelope signals of the first test signal S10 and the second test signal S20 are made approximately the same in magnitude. Therefore, a signal can be detected with high accuracy even if the dynamic range of the envelope detector 1106A or the AD converter 1106B is narrow.

Next, the calculator 1107 will be described.

Figure 20:
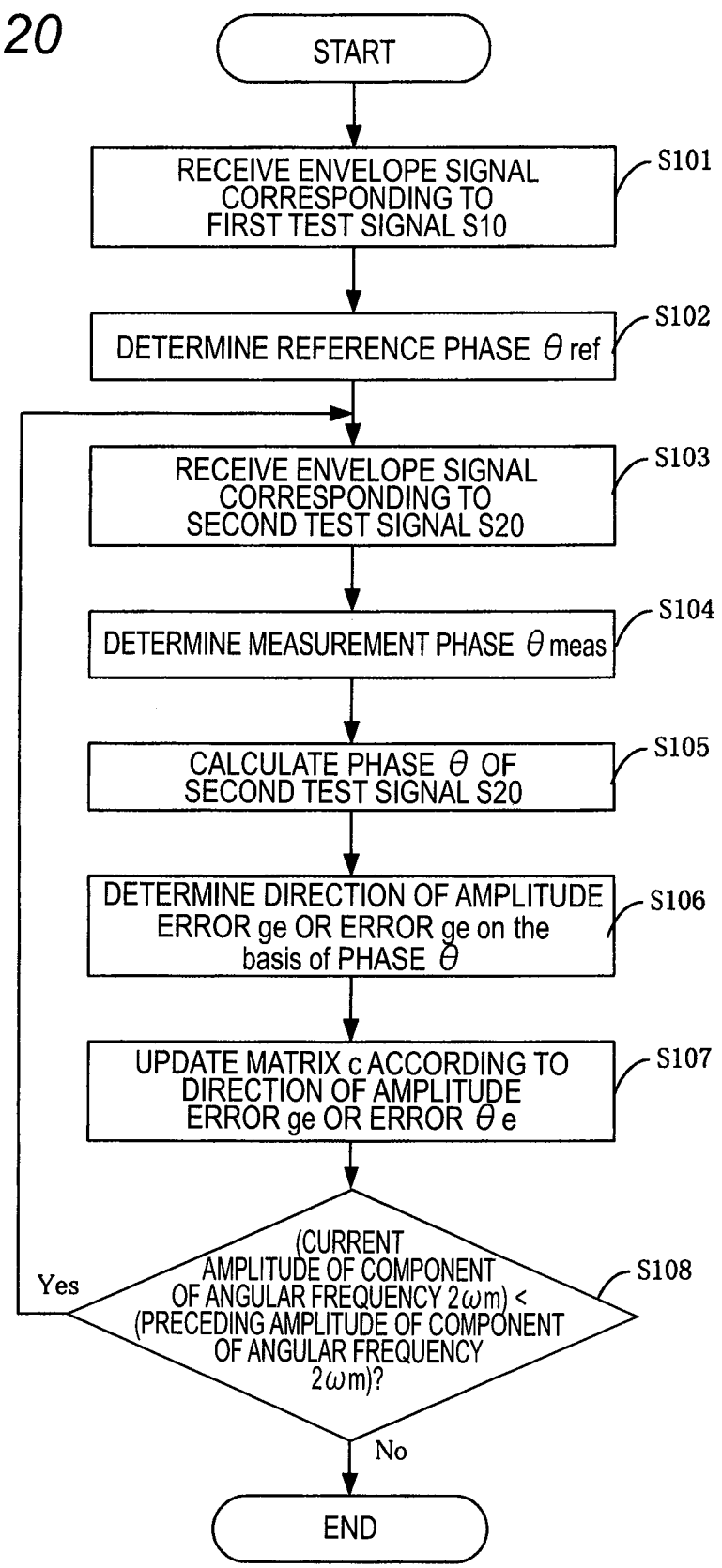
FIG. 20 is a flowchart showing an example operation of a calculator used in the second embodiment of the disclosure.

FIG. 20 is a flowchart showing an example operation of the calculator 1107.

The calculator 1107 receives an envelope signal (first envelope) corresponding to the first test signal S10 from the envelope detector 1106 (step S101).

Upon receiving the first test signal S10, the calculator 1107 performs a frequency analysis by fast Fourier transform (FFT), for example, and thereby determines a phase $\theta_{ref}$ of a component of the angular frequency $\omega_m$ (step S102). The phase $\theta_{ref}$ serves as a reference phase when the second test signal S20 is used.

The calculator 1107 then receives an envelope signal (second envelope) corresponding to the second test signal S20 from the envelope detector 1106 (step S103).

Upon receiving the second test signal S20, the calculator 1107 performs a frequency analysis by fast Fourier transform (FFT), for example, and thereby determines a phase $\theta_{meas}$ of a component of the angular frequency $2\omega_m$ (step S104). The phase $\theta_{meas}$ is a measurement phase of the second test signal S20.

Subsequently, the calculator 1107 calculates a phase $\theta=\theta_{meas}-\theta_{ref}$ (step S105). The phase $\theta$ is a phase of a component of the angular frequency $2\omega_m$ that is caused by IQ imbalance. The transmitter 1100 has a phase rotation of the phase $\theta_{ref}$ that is mainly due to delays in the MUX 1103, the IQ imbalance corrector 1104, the modulator 1105. Therefore, a phase component caused by IQ imbalance can be extracted by eliminating the delay of the system itself using the phase $\theta$.

The calculator 1107 thereafter determines a direction of an amplitude error $g_e$ or a phase error $\theta_e$ on the basis of the value of the phase $\theta$ (step S106).

FIG. 21 is a table showing an example relationship between the phase $\theta$ and the IQ imbalance direction. For example, the information of the relationship shown in FIG. 21 is stored in an LUT which is held by the memory 108

As shown in FIG. 21, if $-45°\leq\theta<45°$, the calculator 1107 judges that the amplitude error $g_e$ is in the negative direction, which means that the I signal component of the output V is larger than in the ideal state. If $45°\leq\theta<135°$, the calculator 1107 judges that the phase error $\theta_e$ is in the negative direction. If $-135°\leq\theta<180°$ or $-180°\leq\theta<135°$, the calculator 1107 judges that the amplitude error $g_e$ is in the positive direction. If $-135°\theta\leq-45°$, the calculator 1107 judges that the phase error $\theta_e$ is in the positive direction.

The calculator 1107 then updates the values in the matrix c which is stored in the LUT according to the direction of the amplitude error $g_e$ or the phase error $\theta_e$ (step S107). The initial values of the values in the matrix c are set so as to make it a unit vector. The accuracy of the correction coefficients can be increased by updating the matrix c.

For example, if the amplitude error $g_e$ is in the negative direction, the calculator 1107 subtracts $\Delta g$ from the value $g_c$ in the elements of the matrix c and does not change the value $\theta_c$. That is, since the I signal component is larger than in the ideal state if the amplitude error $g_e$ is in the negative direction, the calculator 1107 updates the values in the matrix c so as to decrease the I signal component.

If the phase error $\theta_e$ is in the negative direction, the calculator 1107 subtracts $\Delta\theta$ from the value $\theta_c$ in the elements of the matrix c and does not change the value $g_c$. If the phase error $\theta_e$ is in the positive direction, the calculator 1107 adds $\Delta\theta$ to the value $\theta_c$ in the elements of the matrix c and does not change the value $g_c$. If the amplitude error $g_e$ is in the positive direction, the calculator 1107 subtracts $\Delta g$ from the value $g_c$ in the elements of the matrix c and does not change the value $\theta_c$.

The parameters $\Delta g$ and $\Delta\theta$ are adjustment parameters for the amplitude error $g_e$ and the phase error $\theta_e$ which are used when IQ calibration is performed, and are determined by requirements relating to the convergence time and the convergence accuracy. The IQ imbalance corrector 1104 performs correction using an updated matrix c.

The calculator 1107 executes the above steps (steps S103-S107) which use the second test signal S20. The calculator 1107 judges whether or not the current amplitude of the component of the angular frequency $2\omega_m$ is smaller than its preceding amplitude (step S108). If the current amplitude of the component of the angular frequency $2\omega_m$ is smaller than its preceding amplitude, the process returns to step S103.

Therefore, the amplitude of the component of the angular frequency $2\omega_m$ becomes smaller and the IQ imbalance of the second test signal S20 is reduced by repeatedly performing a test using the second test signal.

On the other hand, if the current amplitude of the component of the angular frequency $2\omega_m$ is not smaller than its preceding amplitude, the process of FIG. 20 is finished. That is, the calibration is finished when a state that the amplitude of the component of the angular frequency $2\omega_m$ of the second test signal S20 detected by the envelope detector 1106A no longer becomes smaller is established.

The calculator 1107 calculates a reference phase $\theta_{ref}$ for the second test signal S20 on the basis of a first envelope corresponding to the first test signal S10. The calculator 1107 calculates a measurement phase $\theta_{meas}$ on the basis of a second envelope corresponding to the second test signal S20. And the calculator 1107 calculates correction coefficients on the basis of the measurement phase $\theta_{meas}$ and the reference phase $\theta_{ref}$. For example, the correction coefficients are the elements of the matrix c.

More specifically, it is preferable that the calculator 1107 calculate a phase $\theta$ by subtracting a reference phase $\theta_{ref}$ from a measurement phase $\theta_{meas}$ and calculate correction coefficients on the basis of the phase $\theta$. Even more specifically, it is preferable that the calculator 1107 estimate the direction of an amplitude error $g_e$ or a phase error $\theta_e$ contained in IQ imbalance on the basis of the phase $\theta$ and calculate correction coefficients according to of the direction of the amplitude error $g_e$ or the phase error $\theta_e$.

The above operation of the calculator 1107 makes it possible to accurately estimate a phase $\theta$ caused by IQ-imbalance using a reference phase $\theta_{ref}$ and hence to increase the accuracy of IQ calibration.

It is preferable that the calculator 1107 calculate a measurement phase $\theta_{meas}$ plural times from the second test signal and calculate correction coefficients on the basis of a calculated measurement phase $\theta_{meas}$ and a reference phase plural times. This allows IQ imbalance to decrease gradually and converge.

Next, a description will be made of how the transmitter operates after completion of the calibration.

After completion of the calibration, the transmitter 1100 finishes the calibration mode. Upon the finish of the calibration mode, the transmitter 1100 switches to the data transmission mode. More specifically, the MUX 1103 shown in FIG. 15 selects the output of the baseband signal generator 1102.

Then the IQ imbalance corrector 1104 corrects an IQ signal that is output from the baseband signal generator 1102 by referring to the LUT in which the correction coefficients calculated by the coefficients calculator 108 are stored. Subsequently, the modulator 1105 modulates a corrected signal and a modulated signal is transmitted.

The transmitter 1100 can perform IQ imbalance correction with high accuracy and hence can reduce distortion of a transmission signal even if the dynamic range of the envelope detector 1106 is narrow. For example, IQ calibration may be performed at the time of power-on of the transmitter 1100 or its reactivation from a sleep mode or before the start of a data transmission.

Next, a wireless apparatus 1600 including the transmitter 1100 will be described.

Figure 22:
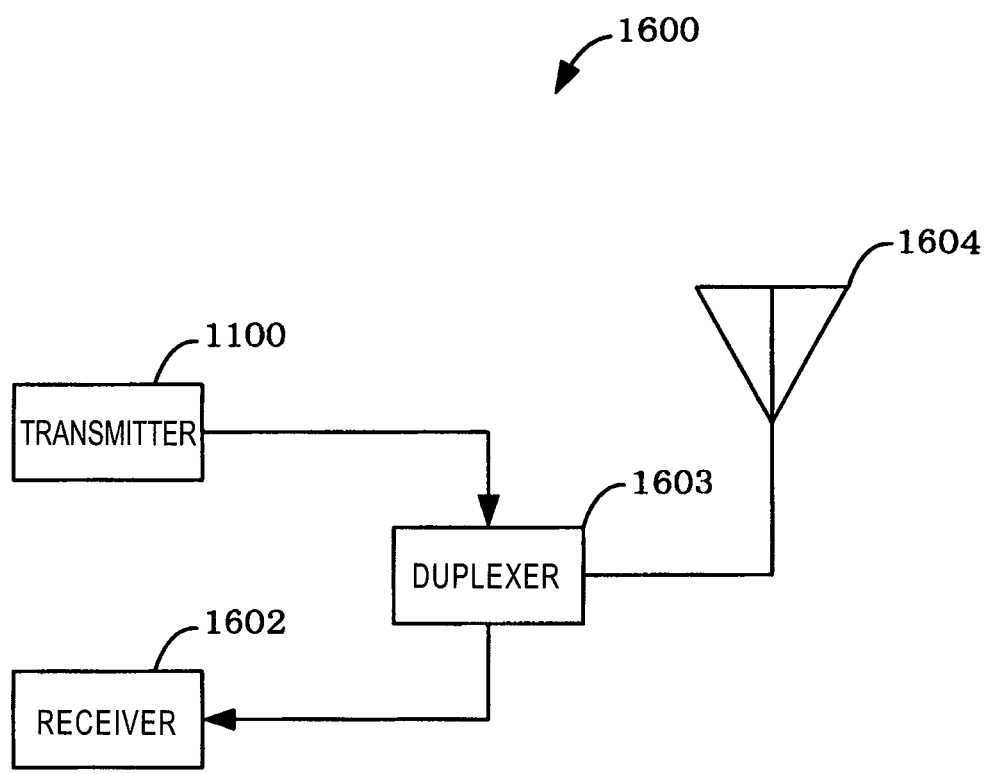
FIG. 22 is a block diagram showing an example configuration of a first wireless apparatus according to the second embodiment of the disclosure.

FIG. 22 is a block diagram showing an example configuration of the wireless apparatus 1600. The wireless apparatus 1600 is equipped with the transmitter 1100, a receiver 1602, a duplexer 1603, and an antenna 1604.

The transmitter 1100 corrects IQ imbalance, modulates desired data, and transmits a modulated signal. The receiver 1602 receives data from another communication apparatus. The duplexer 1603 separates a transmission signal and a reception signal from each other, whereby the antenna 1604 is shared by transmission and reception.

The wireless apparatus 1600 makes it possible to transmit data having only a low degree of distortion.

Figure 23:
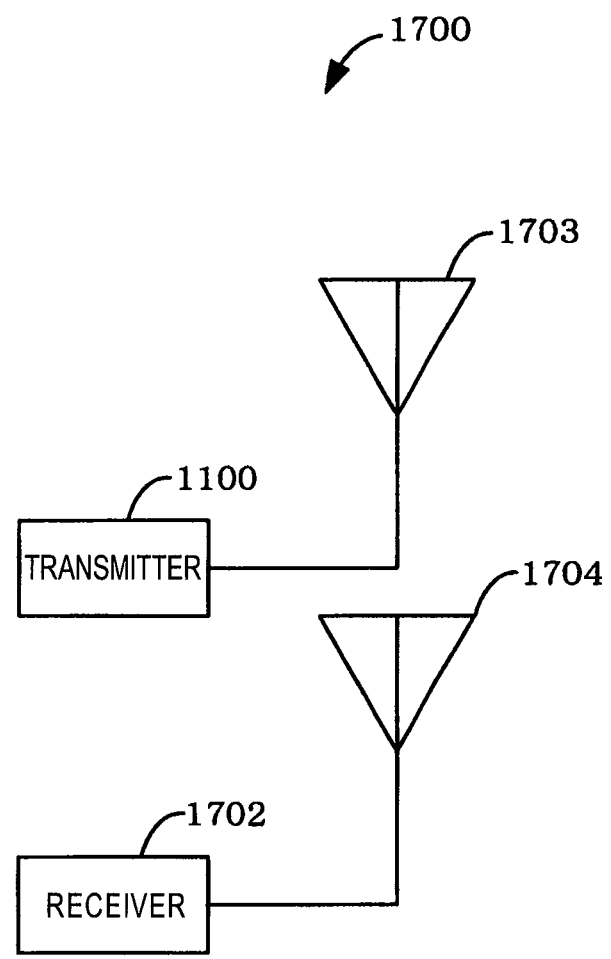
FIG. 23 is a block diagram showing an example configuration of a second wireless apparatus according to the second embodiment of the disclosure.

FIG. 23 shows another wireless apparatus 1700 which is equipped with a transmission antenna 1703 and a reception antenna 1704 which are separate from each other.

This disclosure is not limited to the configurations of the above embodiments. Any configurations are possible as long as they can realize the functions described in the claims or the functions of the configurations of the embodiments.

Although the above embodiments of the disclosure are implemented by hardware, what are described in the disclosure can be implemented by software in cooperation with hardware.

The individual blocks used in describing the embodiments are typically implemented as LSIs which are integrated circuits. They may be implemented as separate chips or all or part of them may be implemented as one chip. Each such chip may be either called an LSI or called an IC, a system LSI, a super-LSI, or an ultra-LSI depending on its integration density.

The technique for producing an integrated circuit is not limited to that for producing an LSI. For example, an FPGA (field programmable gate array) which can be programmed after manufacture of an LSI or a reconfigurable processor in which the connections or settings of circuit cells provided inside an LSI are reconfigurable may be used.

Furthermore, if an integration circuit manufacturing technique that enables replacement of an LSI is developed because of advancement of the semiconductor technologies or a rise of a derivative technology, the function blocks may naturally be integrated by using that technique. For example, the biotechnology is a candidate for such a technology.

(Summary of Modes of Disclosure)

A first transmitter of the disclosure comprises:
a test signal generator configured to generate a test signal;
a frequency characteristics corrector configured to correct an amplitude characteristic and a phase characteristic of the test signal generated by the test signal generator;
a modulator configured to modulate a corrected signal produced by the frequency characteristics corrector through the correction;
an envelope detector configured to detect an envelope of a modulated signal produced by the modulator through the modulation;
a frequency characteristics calculator configured to calculate frequency characteristics of an envelope signal detected by the envelope detector; and
a coefficients calculator configured to calculate, on the basis of the frequency characteristics calculated by the frequency characteristics calculator, correction coefficients to be used by the frequency characteristics corrector to correct the amplitude characteristic and the phase characteristic of the test signal,
wherein the test signal generator generates a test signal in which signal loci in at least two of quadrants of first to fourth quadrants of the IQ plane are not symmetrical with each other.

With this configuration, an amplitude characteristic and a phase characteristic of a test signal can be acquired by offsetting the test signal from the origin in the IQ plane. Therefore, correction coefficients can be calculated on the basis of the amplitude characteristic and the phase characteristic, whereby signal distortion can be corrected with high accuracy.

A second transmitter of the disclosure is the first transmitter as modified in such a manner that the test signal generator generates a test signal that rotates along a signal locus line that is offset by a prescribed amount in the IQ plane and is symmetrical with respect to a reference axis.

A third transmitter of the disclosure is the first transmitter as modified in such a manner that the test signal is a signal that rotates along a signal locus line at a constant speed.

A fourth transmitter of the disclosure is the second transmitter as modified in such a manner that the test signal generator generates a test signal that rotates along a circle that is offset by a prescribed amount in the IQ plane.

A fifth transmitter of the disclosure is the fourth transmitter as modified in such a manner that the test signal is a signal that rotates at a constant speed along the circle that is offset by the prescribed amount in the IQ plane.

A sixth transmitter of the disclosure is any one of the first to fifth transmitters as modified in such a manner that:
the test signal generator sweeps the frequency of the test signal in a prescribed frequency range;
the frequency characteristics calculator extracts complex data from an envelope signal corresponding to each angular frequency component of the test signal; and
the coefficients calculator calculates each correction coefficient on the basis of each complex data extracted by the frequency characteristics calculator.

A seventh transmitter of the disclosure is the sixth transmitter as modified in such a manner that the coefficients calculator calculates reciprocals of the complex data as the correction coefficients, respectively.

An eighth transmitter of the disclosure is the sixth transmitter as modified in such a manner that the coefficients calculator calculates correction coefficients on the basis of a difference between a phase characteristic of the complex data and a linear phase characteristic and an amplitude characteristic of the complex data.

A ninth transmitter of the disclosure is any of the sixth to eighth transmitters as modified in such a manner that it comprises a storage configured to store the correction coefficients, and
wherein the coefficients calculator calculates correction coefficients repeatedly while updating the correction coefficients stored in the storage.

A 10th transmitter of the disclosure is the ninth transmitter as modified in such a manner that the coefficients calculator calculates coefficients for calculation of the correction coefficients on the basis of the complex data extracted by the frequency characteristics calculator, and updates the correction coefficients stored in the storage to a result of adding a weighted version of the coefficients calculated by the coefficients calculator to the correction coefficients stored in the storage.

An 11th transmitter of the disclosure is any one of the first to 10th transmitters as modified in such a manner that the frequency characteristics corrector includes:
a converter configured to convert the test signal which is a time-domain signal into a frequency-domain signal;
a multiplier configured to multiply the frequency-domain signal by the coefficients calculated by the coefficients calculator; and
an inverse converter configured to convert an output signal of the multiplier which is a frequency-domain signal into a time-domain signal.

A 12th transmitter of the disclosure is any one of the first to 10th transmitters as modified in such a manner that the frequency characteristics calculator includes a converter configured to convert the envelope signal which is a time-domain signal into a frequency-domain signal.

A 13th transmitter of the disclosure is any one of the first to 10th transmitters as modified in such a manner that it comprises:
a baseband signal generator configured to generate a baseband signal; and
a transmitter configured to transmit the modulated signal,
wherein the frequency characteristics corrector generates a corrected signal by correcting the baseband signal on the basis of the correction coefficients calculated by the coefficients calculator.

A 14th transmitter of the disclosure comprises:
a test signal generator configured to generate a first test signal and a second test signal;
a signal corrector configured to correct IQ imbalance of a test signal generated by the test signal generator;
a modulator configured to modulate a corrected signal produced by the signal corrector through the correction;
an envelope detector configured to detect an envelope of a modulated signal produced by the modulator through the modulation; and
a correction coefficients processor configured to calculate, on the basis of the envelope detected by the envelope detector, correction coefficients to be used by the signal corrector to correct the IQ imbalance,
wherein the test signal generator generates a first test signal and a second test signal according to a detectable range of the envelope detector; and
wherein the correction coefficients processor calculates a reference phase of the test signal on the basis of a first envelope corresponding to the first test signal, calculates a measurement phase of the test signal on the basis of a second envelope corresponding to the second test signal, and calculates correction coefficients on the basis of the measurement phase and the reference phase.

With this configuration, the detection accuracy of the envelope detector is increased and hence a reference phase can be calculated accurately. Thus, the accuracy of the IQ calibration can be increased.

A 15th transmitter of the disclosure is the 14th transmitter as modified in such a manner that the correction coefficients processor calculates a phase of the second test signal by subtracting the reference phase from the measurement phase, and calculates correction coefficients on the basis of the phase.

A 16th transmitter of the disclosure is the 15th transmitter as modified in such a manner that the correction coefficients processor estimates a direction of an amplitude error or a phase error contained in the IQ imbalance, and calculates correction coefficients according to the direction of the amplitude error or the phase error.

A 17th transmitter of the disclosure is any one of the 14th to 16th transmitters as modified in such a manner that:
the first test signal is an IQ signal for an amplitude modulation signal;
the second test signal is an IQ signal for a single-sideband signal that rotates in the IQ plane around the origin; and
the first test signal has a frequency that is two times a frequency of the second test signal.

An 18th transmitter of the disclosure is any one of the 14th to 17th transmitters as modified in such a manner that the transmitter comprises a storage configured to store information of the correction coefficients, and
wherein the correction coefficients processor updates the information of the correction coefficients stored in the storage to the calculated correction coefficients.

A 19th transmitter of the disclosure is the 18th transmitter as modified in such a manner that the correction coefficients processor calculates a measurement phase of the test signal plural times, and repeatedly calculates correction coefficients plural times on the basis of the calculated measurement phase and reference phase.

A 20th transmitter of the disclosure is any one of the 14th to 19th transmitters as modified in such a manner that transmitter comprises:
a baseband signal generator configured to generate a baseband signal; and
a transmitter configured to transmit the modulated signal,
wherein the signal corrector generates a corrected signal by correcting the baseband signal on the basis of the correction coefficients calculated by the correction coefficients processor.

A 21st signal generation device of the disclosure comprises:
a test signal generator configured to generate a test signal;
a frequency characteristics corrector configured to correct an amplitude characteristic and a phase characteristic of the test signal generated by the test signal generator;
a frequency characteristics calculator configured to calculate frequency characteristics of an envelope signal of a modulated signal produced by modulating a corrected signal that is produced by the frequency characteristics corrector through the correction; and
a coefficients calculator configured to calculate, on the basis of the frequency characteristics calculated by the frequency characteristics calculator, correction coefficients to be used by the frequency characteristics corrector to correct the amplitude characteristic and the phase characteristic of the test signal,
wherein the test signal generator generates a test signal in which signal loci in at least two of quadrants of first to fourth quadrants of the IQ plane are not symmetrical with each other.

With this configuration, an amplitude characteristic and a phase characteristic of a test signal can be acquired by offsetting the test signal from the origin in the IQ plane. Therefore, correction coefficients can be calculated on the basis of the amplitude characteristic and the phase characteristic, whereby signal distortion can be corrected with high accuracy.

A 22nd signal generation device of the disclosure comprises:
a test signal generator configured to generate a first test signal and a second test signal;
a signal corrector configured to correct IQ imbalance of a test signal generated by the test signal generator; and
a correction coefficients processor configured to calculate, on the basis of an envelope of a modulated signal produced by modulating a corrected signal that is produced by the signal corrector through the correction,
wherein the test signal generator generates a first test signal and a second test signal according to a detectable range of an envelope detector for detecting the envelope; and
wherein the correction coefficients processor calculates a reference phase of the test signal on the basis of a first envelope corresponding to the first test signal, calculates a measurement phase of the test signal on the basis of a second envelope corresponding to the second test signal, and calculates correction coefficients on the basis of the measurement phase and the reference phase.

With this configuration, the detection accuracy of the envelope detector is increased and hence a reference phase can be calculated accurately. Thus, the accuracy of the IQ calibration can be increased.

A 23rd calibration method of the disclosure comprises:
a test signal generation step of generating a test signal;
a frequency characteristics correction step of correcting an amplitude characteristic and a phase characteristic of the generated test signal;
a frequency characteristics calculation step of calculating frequency characteristics of an envelope signal of a modulated signal produced by modulating a corrected signal produced through the correction; and
a coefficients calculation step of calculating, on the basis of the calculated frequency characteristics, correction coefficients to be used for correcting the amplitude characteristic and the phase characteristic of the test signal,
wherein the test signal generation step generates a test signal in which signal loci in each of at least two pairs of quadrants of first to fourth quadrants of the IQ plane are not symmetrical with each other.

With this method, an amplitude characteristic and a phase characteristic of a test signal can be acquired by offsetting the test signal from the origin in the IQ plane. Therefore, correction coefficients can be calculated on the basis of the amplitude characteristic and the phase characteristic, whereby signal distortion can be corrected with high accuracy.

A 24th signal generation method of the disclosure comprises:
a test signal generation step of generating a first test signal and a second test signal;
a correction step of correcting IQ imbalance of a generated test signal; and
a calculation step of calculating, on the basis of an envelope of a modulated signal produced by modulating a corrected signal that is produced through the correction,
wherein the test signal generation step generates a first test signal and a second test signal according to a detectable range of an envelope detector for detecting the envelope; and wherein the calculation step calculates a reference phase of the test signal on the basis of a first envelope corresponding to the first test signal, calculates a measurement phase of the test signal on the basis of a second envelope corresponding to the second test signal, and calculates correction coefficients on the basis of the measurement phase and the reference phase.

With this method, the detection accuracy of the envelope detector is increased and hence a reference phase can be calculated accurately. Thus, the accuracy of the IQ calibration can be increased.

Although the disclosure has been described in detail with reference to the particular embodiments, it is apparent that those skilled in the art could make various changes or modifications without departing from the spirit and scope of the disclosure.

The present application is based on Japanese Patent Application No. 2012-074719 filed on Mar. 28, 2012 and Japanese Patent Application No. 2012-078308 filed on Mar. 29, 2012, the disclosures of which are incorporated herein by reference.

INDUSTRIAL APPLICABILITY

For example, this disclosure is useful when applied to transmitters, signal generation devices, calibration methods, etc. which can correct signal distortion with high accuracy. For example, this disclosure is also useful when applied to transmitters, signal generation devices, calibration methods, etc. which can increase the accuracy of IQ calibration.

DESCRIPTION OF SYMBOLS

100: Transmitter
101: Test signal generator
102: Data generator
103: MUX
104: Frequency characteristics corrector
105: Modulator
106: Envelope detector
106A: Envelope detector
106B: AD converter
107: Frequency characteristics calculator
108: Coefficients calculator
109: Memory
204: Fourier transformer
205: Multiplier
206: Inverse Fourier transformer
301: Digital filter
400: Wireless apparatus
402: Receiver
403: Duplexer
404: Antenna
500: Wireless apparatus
502: Receiver
503, 504: Antenna
1100: Transmitter
1101: Test signal generator
1102: Baseband signal generator
1103: MUX
1104: IQ imbalance corrector
1105: Modulator
1106: Envelope detector
1106A: Envelope detector
1106B: AD converter
1107: calculator
1108: Memory
1201, 1202, 1203, 1204: Multiplier
1205, 1206: Adder
1301, 1302: Multiplier
1303: Oscillator
1304: Adder
1600: Wireless apparatus
1602: Receiver
1603: Duplexer
1604: Antenna
1700: Wireless apparatus
1702: Receiver
1703, 1704: Antenna

The invention claimed is:

1. A transmitter comprising:
a test signal generator which, in operation, generates a test signal;
a frequency characteristics corrector which, in operation, corrects an amplitude characteristic and a phase characteristic of the test signal generated by the test signal generator;
a modulator which, in operation, modulates a corrected signal produced by the frequency characteristics corrector;
an envelope detector which, in operation, detects an envelope of a modulated signal produced by the modulator;
a frequency characteristics calculator which, in operation, calculates frequency characteristics of an envelope signal detected by the envelope detector; and
a coefficients calculator which, in operation, calculates, on the basis of the frequency characteristics calculated by the frequency characteristics calculator, correction coefficients to be used by the frequency characteristics corrector to correct the amplitude characteristic and the phase characteristic of the test signal,
wherein the test signal generator, in operation, generates the test signal in which signal loci in at least two of quadrants of first to fourth quadrants of the IQ plane are not symmetrical with each other, and sweeps frequencies in a prescribed frequency range of the test signal;
wherein the frequency characteristics calculator, in operation, extracts a set of complex data respectively from a set of the envelope signals, which respectively correspond to angular frequency components of the test signal; and
wherein the coefficients calculator, in operation, calculates the correction coefficients on the basis of the extracted set of complex data.

2. The transmitter according to claim 1, wherein the test signal generator, in operation, generates the test signal that rotates along a signal locus line, which is symmetrical and is offset by a prescribed amount from a reference axis in the IQ plane.

3. The transmitter according to claim 2, wherein the test signal generator, in operation, generates the test signal that rotates along a circle, which is offset by the prescribed amount from the reference axis in the IQ plane.

4. The transmitter according to claim 3, wherein the test signal is a signal that rotates at a constant speed along the circle.

5. The transmitter according to claim 1, wherein the test signal is a signal that rotates along a signal locus line at a constant speed.

6. The transmitter according to claim 1, wherein the coefficients calculator, in operation, calculates reciprocals of the set of complex data as the correction coefficients.

7. The transmitter according to claim 1, wherein the coefficients calculator, in operation, calculates the correction coefficients on the basis of amplitude characteristics of the set of complex data and differences between phase characteristics of the set of complex data and linear phase characteristics.

8. The transmitter according to claim 1, further comprising:
a storage which, in operation, stores the correction coefficients,
wherein the coefficients calculator, in operation, calculates the correction coefficients repeatedly while updating the correction coefficients stored in the storage.

9. The transmitter according to claim 8, wherein the coefficients calculator, in operation, calculates first coefficients used to calculate the correction coefficients on the basis of the set of complex data extracted by the frequency characteristics calculator, and updates the correction coefficients stored in the storage by adding weighted versions of the first coefficients to the correction coefficients stored in the storage.

10. The transmitter according to claim 1, wherein the frequency characteristics corrector includes:
a converter that converts the test signal, which is a time-domain signal, into a frequency-domain signal;
a multiplier that multiplies the frequency-domain signal by the first coefficients calculated by the coefficients calculator; and
an inverse converter that converts an output signal of the multiplier, which is a frequency-domain signal into a time-domain signal.

11. The transmitter according to claim 1, wherein the frequency characteristics calculator includes a converter that converts the envelope signal which is a time-domain signal, into a frequency-domain signal.

12. The transmitter according to claim 1, further comprising:
a baseband signal generator that generates a baseband signal; and
a transmitter that transmits the modulated signal,
wherein the frequency characteristics corrector, in operation, generates the corrected signal by correcting the baseband signal on the basis of the correction coefficients calculated by the coefficients calculator.

13. A transmitter comprising:
a test signal generator which, in operation, generates a first test signal and a second test signal;
a signal corrector which, in operation, corrects IQ imbalance of the first test signal and the second test signal generated by the test signal generator;
a modulator which, in operation, modulates a corrected signal produced by the signal corrector;
an envelope detector which, in operation, detects an envelope of a modulated signal produced by the modulator; and
a correction coefficients processor which, in operation, calculates, on the basis of the envelope detected by the envelope detector, correction coefficients to be used by the signal corrector to correct the IQ imbalance,
wherein the test signal generator, in operation, generates the first test signal and the second test signal according to a detectable range of the envelope detector;
wherein the correction coefficients processor, in operation, calculates a reference phase of the first test signal on the basis of a first envelope corresponding to the first test signal, calculates a measurement phase of the second test signal on the basis of a second envelope corresponding to the second test signal, and calculates the correction coefficients on the basis of the measurement phase and the reference phase;
wherein the first test signal is an IQ signal for an amplitude modulation signal;
wherein the second test signal is an IQ signal for a single-sideband signal, which rotates about the origin in the IQ plane; and
wherein the first test signal has a frequency that is two times a frequency of the second test signal.

14. The transmitter according to claim 13, wherein the correction coefficients processor, in operation, calculates a phase of the second test signal by subtracting the reference phase from the measurement phase, and calculates the correction coefficients on the basis of the phase of the second test signal.

15. The transmitter according to claim 14, wherein the correction coefficients processor, in operation, estimates a direction of an amplitude error or a phase error contained in the IQ imbalance, and calculates the correction coefficients according to the direction of the amplitude error or the phase error.

16. The transmitter according to claim 13, further comprising:
a storage which, in operation, stores information regarding the correction coefficients,
wherein the correction coefficients processor, in operation, updates the information regarding the correction coefficients stored in the storage based on the calculated correction coefficients.

17. The transmitter according to claim 16, wherein the correction coefficients processor, in operation, calculates the measurement phase of the second test signal plural times, and repeatedly calculates the correction coefficients plural times on the basis of the calculated measurement phase and reference phase.

18. The transmitter according to claim 13, further comprising:
a baseband signal generator that generates a baseband signal; and
a transmitter that transmits the modulated signal,
wherein the signal corrector, in operation, generates the corrected signal by correcting the baseband signal on the basis of the correction coefficients calculated by the correction coefficients processor.

19. A signal generation device comprising:
a test signal generator which, in operation, generates a test signal;
a frequency characteristics corrector which, in operation, corrects an amplitude characteristic and a phase characteristic of the test signal generated by the test signal generator;
a frequency characteristics calculator which, in operation, calculates frequency characteristics of an envelope signal of a modulated signal produced by modulating a corrected signal that is produced by the frequency characteristics corrector; and
a coefficients calculator which, in operation, calculates, on the basis of the frequency characteristics calculated by the frequency characteristics calculator, correction coefficients to be used by the frequency characteristics corrector to correct the amplitude characteristic and the phase characteristic of the test signal,
wherein the test signal generator, in operation, generates the test signal in which signal loci in at least two of quadrants of first to fourth quadrants of the IQ plane are not symmetrical with each other, and sweeps frequencies in a prescribed frequency range of the test signal;
wherein the frequency characteristics calculator, in operation, extracts a set of complex data respectively from a set of envelope signals, which respectively correspond to angular frequency components of the test signal; and wherein the coefficients calculator, in operation, calculates the correction coefficients on the basis of the extracted set of complex data.

20. A signal generation device comprising:

a test signal generator which, in operation, generates a first test signal and a second test signal;

a signal corrector which, in operation, corrects IQ imbalance of the first test signal and the second test signal generated by the test signal generator; and a correction coefficients processor which, in operation, calculates, on the basis of an envelope of a modulated signal produced by modulating a corrected signal that is produced by the signal corrector, correction coefficients to be used by the signal corrector to correct the IQ imbalance, wherein the test signal generator, in operation, generates the first test signal and the second test signal according to a detectable range of detecting the envelope; and wherein the correction coefficients processor, in operation, calculates a reference phase of the first test signal on the basis of a first envelope corresponding to the first test signal, calculates a measurement phase of the second test signal on the basis of a second envelope corresponding to the second test signal, and calculates the correction coefficients on the basis of the measurement phase and the reference phase;

wherein the first test signal is an IQ signal for an amplitude modulation signal;

wherein the second test signal is an IQ signal for a single-sideband signal, which rotates about the origin in the IQ plane; and wherein the first test signal has a frequency that is two times a frequency of the second test signal.

21. A calibration method comprising:
i) generating a test signal;
ii) correcting an amplitude characteristic and a phase characteristic of the generated test signal;
iii) calculating frequency characteristics of an envelope signal of a modulated signal produced by modulating a corrected signal produced by step ii); and
iv) calculating, on the basis of the calculated frequency characteristics, correction coefficients to be used for correcting the amplitude characteristic and the phase characteristic of the test signal, wherein step i) includes generating the test signal in which signal loci in each of at least two pairs of quadrants of first to fourth quadrants of the IQ plane are not symmetrical with each other, and sweeping frequencies in a prescribed frequency range of the test signal;

wherein step iii) includes extracting a set of complex data respectively from a set of envelope signals, which respectively correspond to angular frequency components of the test signal; and wherein step iv) includes calculating the correction coefficients on the basis of the extracted set of complex data.

22. A signal generation method comprising:
i) generating a first test signal and a second test signal;
ii) correcting IQ imbalance of the first test signal and the second test signal; and
iii) calculating, on the basis of an envelope of a modulated signal produced by modulating a corrected signal that is produced by step ii), correction coefficients to be subsequently used in step ii) to correct the IQ balance, wherein step i) includes generating the first test signal and the second test signal according to a detectable range of detecting the envelope; and wherein step iii) includes calculating a reference phase of the first test signal on the basis of a first envelope corresponding to the first test signal, calculating a measurement phase of the second test signal on the basis of a second envelope corresponding to the second test signal, and calculating the correction coefficients on the basis of the measurement phase and the reference phase;

wherein the first test signal is an IQ signal for an amplitude modulation signal;

wherein the second test signal is an IQ signal for a single-sideband signal, which rotates about the origin in the IQ plane; and wherein the first test signal has a frequency that is two times a frequency of the second test signal.

* * * * *